(12) United States Patent
Typrin et al.

(10) Patent No.: US 9,641,954 B1
(45) Date of Patent: May 2, 2017

(54) PHONE COMMUNICATION VIA A VOICE-CONTROLLED DEVICE

(71) Applicant: Rawles LLC, Wilmington, DE (US)

(72) Inventors: Marcello Typrin, Menlo Park, CA (US); Andrew Ryan Cooper, San Jose, CA (US); Gregory Michael Hart, Mercer Island, WA (US); Ian W. Freed, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 250 days.

(21) Appl. No.: 13/722,805

(22) Filed: Dec. 20, 2012

Related U.S. Application Data

(60) Provisional application No. 61/679,460, filed on Aug. 3, 2012.

(51) Int. Cl.
*H04W 4/00* (2009.01)
(52) U.S. Cl.
CPC ..................... *H04W 4/00* (2013.01)
(58) Field of Classification Search
CPC ........ H04B 1/46; H04W 88/02; H04M 1/271; H04M 19/04; H04M 7/006; H04M 3/42229; H04M 3/42314; H04Q 2213/135; H04L 29/08072
USPC ........... 455/79, 422.1, 563, 567; 379/201.01, 379/201.02, 201.03, 221.15; 709/201, 709/202, 203
See application file for complete search history.

(56) References Cited

U.S. PATENT DOCUMENTS

| | | | |
|---|---|---|---|
| 6,625,474 B1 * | 9/2003 | Bussan et al. ................ 455/563 |
| 7,418,392 B1 | 8/2008 | Mozer et al. | |
| 7,466,810 B1 * | 12/2008 | Quon et al. .............. 379/201.01 |
| 7,720,683 B1 | 5/2010 | Vermeulen et al. | |
| 7,774,204 B2 | 8/2010 | Mozer et al. | |
| 2010/0330908 A1 * | 12/2010 | Maddern ............. H04M 1/6058 455/41.2 |
| 2012/0065971 A1 * | 3/2012 | Schrager ...................... 704/235 |
| 2012/0223885 A1 | 9/2012 | Perez | |

(Continued)

FOREIGN PATENT DOCUMENTS

WO    WO2011088053    7/2011

OTHER PUBLICATIONS

Nathan_WO2007_080517_A2.pdf.*

(Continued)

*Primary Examiner* — Charles Appiah
*Assistant Examiner* — Alexander Yi
(74) *Attorney, Agent, or Firm* — Lee & Hayes, PLLC

(57) ABSTRACT

A device that includes a microphone and a speaker may capture audio uttered by a user. The device, or another device, may then perform a particular operation in response to the captured audio. A user's cell phone number may be associated with the device. When an incoming call is directed to the user's cell phone, the device may generate a notification. The user may utter a command that causes the device to establish an audio connection with a cellular carrier network, thereby facilitating the phone conversation while bypassing the cell phone. Similarly, a user may make an outgoing call associated with the user's cell phone. The outgoing call is facilitated through an audio connection between the device and the cellular carrier network, bypassing the cell phone.

24 Claims, 15 Drawing Sheets

(56) References Cited

U.S. PATENT DOCUMENTS

| | | | | |
|---|---|---|---|---|
| 2012/0235865 A1* | 9/2012 | Nath | ................ | G01S 5/0252 |
| | | | | 342/451 |
| 2012/0244885 A1* | 9/2012 | Hefetz | ................ | G06Q 20/32 |
| | | | | 455/456.2 |
| 2013/0055348 A1* | 2/2013 | Strauss | ................ | G06F 21/31 |
| | | | | 726/3 |

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

* cited by examiner

PHONE COMMUNICATION VIA A VOICE-CONTROLLED DEVICE

RELATED APPLICATION

This application claims priority to U.S. Provisional Patent Application Ser. No. 61/679,460, entitled "Phone Communication Via a Voice-Controlled Device", which was filed on Aug. 3, 2012 and which is incorporated by reference herein.

BACKGROUND

There are various means for voice communication between individuals, including cell phones, voice over IP (VoIP) services, landline phones, and so on. In addition, homes are becoming more wired and connected with the proliferation of computing devices such as desktops, tablets, entertainment systems, and portable communication devices. As computing devices evolve, many different ways have been introduced to allow users to interact with these devices, such as through mechanical means (e.g., keyboards, mice, etc.), touch screens, motion, and gesture. Another way to interact with computing devices is through speech.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

This disclosure describes, in part, techniques for enabling phone communication using a voice-controlled assistant (VCA). For instance, a VCA may be implemented as a device that includes a microphone and a speaker, and that is communicatively distinct from a user's cell phone. The VCA may receive notification of an incoming call being received at a user's cell phone, and enable a user to accept the call through the device. Similarly, the device may initiate an outbound call in association with the user's cell phone. The device may utilize a network-accessible (or "cloud-based") service to establish communication with a cellular carrier network to enable communication between the VCA and another user device. In an example implementation, the VCA may communicate with the cellular carrier network via a voice over IP (VoIP) connection.

The devices and techniques described herein may be implemented in a variety of different architectures and contexts. One non-limiting and illustrative implementation is described below.

Figure 1:
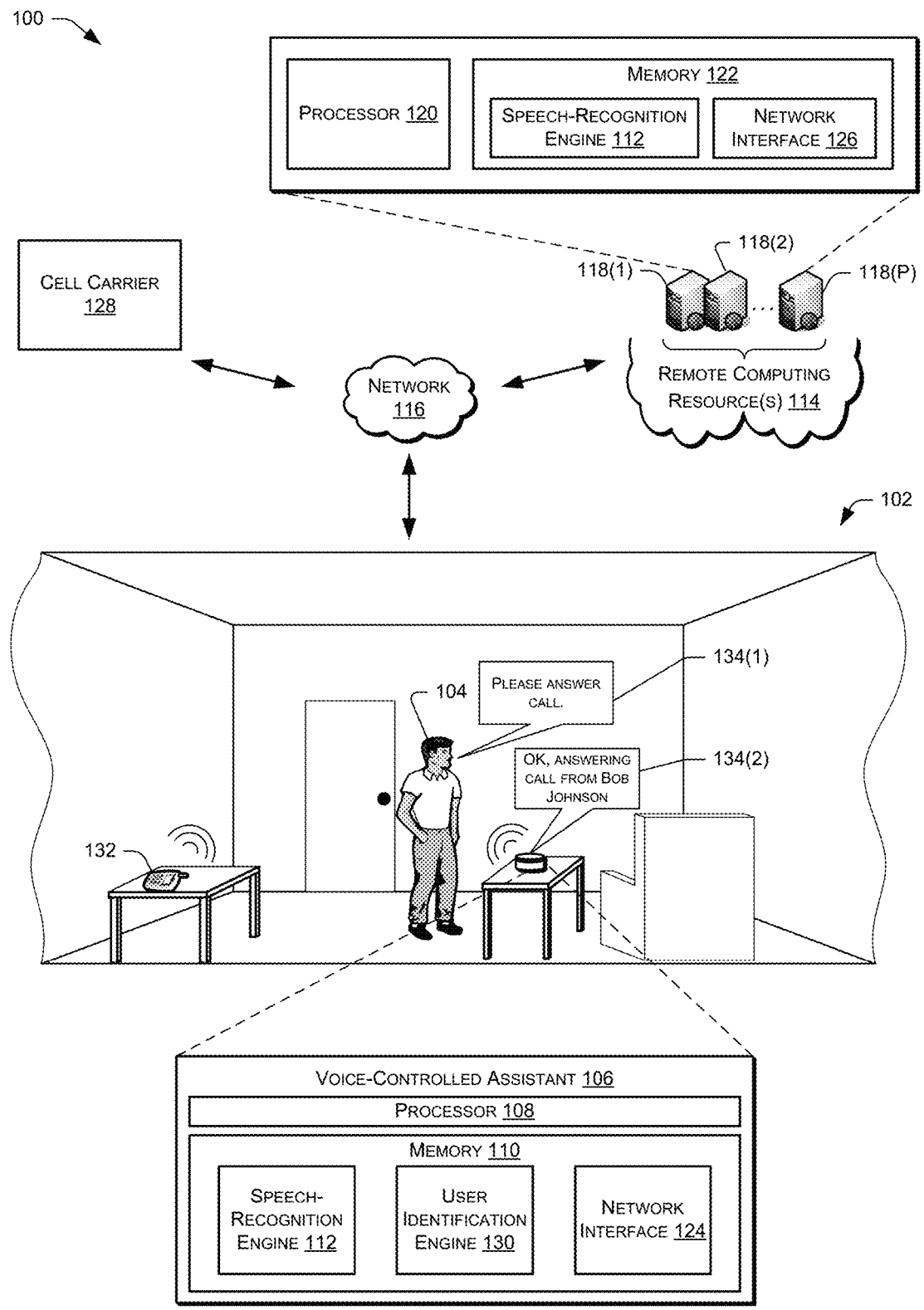
FIG. 1 shows an illustrative voice interaction computing architecture set in a home environment. The architecture includes a voice-controlled assistant physically situated in the home, along with a user who is uttering a command to the voice-controlled assistant. The voice-controlled assistant, or another device, captures audio that includes the command and identifies the user issuing the command.

FIG. 1 shows an illustrative voice interaction computing architecture 100 set in a home environment 102 that includes a user 104. The architecture 100 also includes an electronic voice-controlled assistant (VCA) 106 with which the user 104 may interact. In the illustrated implementation, the voice-controlled assistant 106 is positioned on a table within a room of the home environment 102. In other implementations, the VCA 106 may be placed in any number of locations (e.g., ceiling, wall, in a lamp, beneath a table, under a chair, etc.). Further, more than one assistant 106 may be positioned in a single room, or one assistant may be used to accommodate user interactions from more than one room.

Generally, the voice-controlled assistant 106 has at least one microphone and at least one speaker to facilitate audio interactions with the user 104 and/or other users. In some instances, the voice-controlled assistant 106 is implemented without a haptic input component (e.g., keyboard, keypad, touch screen, joystick, control buttons, etc.) or a display. In certain implementations, a limited set of one or more haptic input components may be employed (e.g., a dedicated button to initiate a configuration, power on/off, etc.). Nonetheless, the primary and potentially only mode of user interaction with the electronic assistant 106 may be through voice input and audible output. One example implementation of the voice-controlled assistant 106 is provided below in more detail with reference to FIG. 2.

The microphone of the voice-controlled assistant 106 detects audio from the environment 102, such as sounds uttered from the user 104. As illustrated, the voice-controlled assistant 106 includes a processor 108 and memory 110, which stores or otherwise has access to a speech-recognition engine 112. As used herein, a processor may include multiple processors and/or a processor having multiple cores. The speech-recognition engine 112 performs speech recognition on audio captured by the microphone, such as utterances spoken by the user 104. The voice-controlled assistant 106 may perform certain actions in response to recognizing different speech from the user 104. The user may speak predefined commands (e.g., "Awake"; "Sleep"), or may use a more casual conversation style when interacting with the assistant 106 (e.g., "I'd like to go to a movie. Please tell me what's playing at the local cinema.").

In some instances, the voice-controlled assistant 106 may operate in conjunction with or may otherwise utilize computing resources 114 that are remote from the environment 102. For instance, the voice-controlled assistant 106 may couple to the remote computing resources 114 over a network 116. As illustrated, the remote computing resources 114 may be implemented as one or more servers 118(1), 118(2), . . . , 118(P) and may, in some instances form a portion of a network-accessible computing platform implemented as a computing infrastructure of processors, storage, software, data access, and so forth that is maintained and accessible via a network such as the Internet. The remote computing resources 114 do not require end-user knowledge of the physical location and configuration of the system that delivers the services. Common expressions associated for these remote computing devices 114 include "on-demand computing", "software as a service (SaaS)", "platform computing", "network-accessible platform", "cloud services", "data centers", and so forth.

The servers 118(1)-(P) include a processor 120 and memory 122, which may store or otherwise have access to some or all of the components described with reference to the memory 110 of the voice-controlled assistant 106. For instance, the memory 122 may have access to and utilize the speech-recognition engine 112 or another speech recognition engine for receiving audio signals from the assistant 106, recognizing speech and, potentially, causing performance of an action in response. In some examples, the voice-controlled assistant 106 may upload audio data to the remote computing resources 114 for processing, given that the remote computing resources 114 may have a computational capacity that far exceeds the computational capacity of the voice-controlled assistant 106. Therefore, the voice-controlled assistant 106 may utilize the speech-recognition engine 112 at the remote computing resources 114 for performing relatively complex analysis on audio captured from the environment 102.

Regardless of whether the speech recognition occurs locally or remotely from the environment 102, the voice-controlled assistant 106 may receive vocal input from the user 104 and the assistant 106 and/or the resources 114 may perform speech recognition to interpret a user's operational request or command. The requests may be for essentially any type of operation, such as database inquires, requesting and consuming entertainment (e.g., gaming, finding and playing music, movies or other content, etc.), personal management (e.g., calendaring, note taking, etc.), online shopping, financial transactions, telephone communication, and so forth.

The voice-controlled assistant 106 and the remote computing resources 114 may communicatively couple to the network 116 via network interface 124 and network interface 126, respectively, using wired technologies (e.g., wires, USB, fiber optic cable, etc.), wireless technologies (e.g., RF, cellular, satellite, Bluetooth, etc.), or other connection technologies. The network 116 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

In addition to communicating with each other over the network 116, the VCA 106 and the computing resources 114 may also each communicate with a cell carrier 128 over the network 116 to enable telephone communication using the VCA 106.

As illustrated, the memory 110 of the voice-controlled assistant 106 also stores or otherwise has access to a user identification engine 130, which functions to identify a user that utters an audible command.

Upon receiving audio within the environment 102, the speech-recognition engine 112 may first attempt to identify whether or not the audio contains speech, such as speech from the user 104. If so, then the speech-recognition engine 112 may perform automatic speech recognition (ASR) on the audio and may perform an action corresponding to any command from the audio. For instance, in the illustrated example, when an incoming call is being signaled by the user's cell phone 132 and the VCA 106, the user 104 issues a command 134(1) requesting that the voice-controlled assistant 106 answer the incoming phone call. As such, the speech-recognition engine 112 may identify this command and the voice-controlled assistant 106 answers the incoming call.

In addition, and as illustrated, the voice-controlled assistant 106 may output a response 134(2) after performing the speech recognition. For instance, the voice-controlled assistant 106 may output an indication that the assistant will comply with the request, with this indication being audible, visual, or the like. Here, for instance, the voice-controlled assistant 106 audibly outputs the response 134(2), indicating that the voice-controlled assistant 106 will answer the phone call as requested. In the illustrated example, the audible response also includes the caller's name, which may be extracted from caller ID information.

Figure 2:
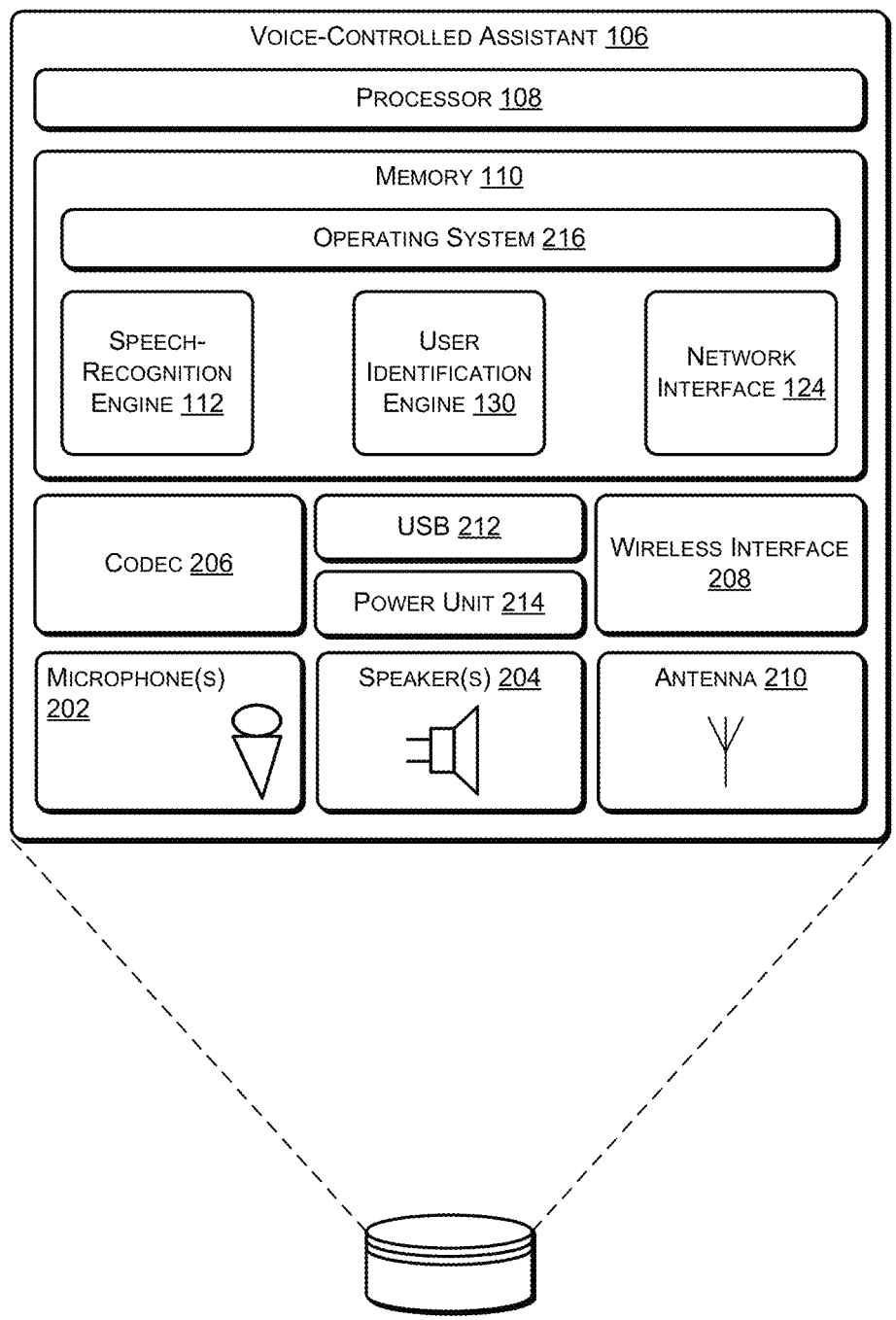
FIG. 2 shows a block diagram of selected functional components implemented in the voice-controlled assistant of FIG. 1.

FIG. 2 shows selected functional components of the voice-controlled assistant 106 in more detail. Generally, the voice-controlled assistant 106 may be implemented as a standalone device that is relatively simple in terms of functional capabilities with limited input/output components, memory and processing capabilities. For instance, the voice-controlled assistant 106 does not have a keyboard, keypad, or other form of mechanical input in some implementations, nor does it have a display or touch screen to facilitate visual presentation and user touch input. Instead, the assistant 106 may be implemented with the ability to receive and output audio, a network interface (wireless or wire-based), power, and limited processing/memory capabilities.

In the illustrated implementation, the voice-controlled assistant 106 includes the processor 108 and memory 110. The memory 110 may include computer-readable storage media ("CRSM"), which may be any available physical media accessible by the processor 108 to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by the processor 108.

The voice-controlled assistant 106 includes one or more microphones 202 to receive audio input, such as user voice input, and one or more speakers 204 to output audio sounds. A codec 206 is coupled to the microphone 202 and speaker 204 to encode and/or decode the audio signals. The codec may convert audio data between analog and digital formats. A user may interact with the assistant 106 by speaking to it, and the microphone 202 captures the user speech. The codec 206 encodes the user speech and transfers that audio data to other components. The assistant 106 can communicate back to the user by emitting audible statements through the speaker 204. In this manner, the user interacts with the voice-controlled assistant simply through speech, without use of a keyboard or display common to other types of devices.

In the illustrated example, the voice-controlled assistant 106 includes a wireless interface 208 coupled to an antenna 210 to facilitate a wireless connection to a network. The wireless interface 208 may implement one or more of various wireless technologies, such as wifi, Bluetooth, RF, and so on.

The assistant 106 may also include one or more device interfaces 212 to facilitate a wired connection to a network, or a plug-in network device that communicates with other wireless networks. The interfaces 212 may comprise a USB port and/or other forms of wired connections such as a broadband connection. A power unit 214 is further provided to distribute power to the various components on the assistant 106.

The voice-controlled assistant 106 is designed to support audio interactions with the user, in the form of receiving voice commands (e.g., words, phrase, sentences, etc.) from the user and outputting audible feedback to the user. Accordingly, in the illustrated implementation, there are no haptic input devices, such as navigation buttons, keypads, joysticks, keyboards, touch screens, and the like. Further there is no display for text or graphical output. In one implementation, the voice-controlled assistant 106 may include non-input control mechanisms, such as basic volume control button(s) for increasing/decreasing volume, as well as power and reset buttons. There may also be a simple light element (e.g., LED) to indicate a state such as, for example, when power is on. But, otherwise, the assistant 106 does not use or need to use any input devices or displays in some instances.

Several modules such as instructions, datastores, and so forth may be stored within the memory 110 and configured to execute on the processor 108. An operating system module 216 is configured to manage hardware and services (e.g., wireless unit, USB, Codec) within and coupled to the assistant 106 for the benefit of other modules.

In addition, the memory 110 may include the speech-recognition engine 112, the user identification engine 130, and the network interface 124 discussed above. Also as discussed above, some or all of the engines, data stores, and components may reside additionally or alternatively at the remote computing resources 114.

As described below, a voice-controlled assistant (e.g., the assistants described above) may be used to conduct both inbound and outbound phone calls. In one example, a user receives a call on his cell phone while at home or at any other location that includes a voice-controlled assistant (VCA). The user is able to answer the call from either the voice-controlled assistant 106, by issuing a voice command (e.g., "Assistant, answer phone") or by selecting the "answer" key on his cell phone. If the user answers via the voice-controlled assistant 106, the user is able to conduct the phone call on the voice-controlled device 106. If the user answers the call on his cell phone, the user is able to conduct the phone call on the cell phone.

Various methods may be used to control an audible ringing of the voice-controlled assistant 106 to indicate an incoming call. One approach is to have the voice-controlled assistant 106 audibly ring when the user's cell phone is in close proximity to the voice-controlled assistant 106. Another approach involves silently ringing the voice-controlled assistant 106 regardless of whether the voice-controlled assistant 106 and cell phone are in close proximity of each other.

In another example, the user may place an outbound call via the voice-controlled assistant 106 by speaking a voice command (e.g., "Assistant, call Bob"). The call is placed across a cellular carrier network and the caller ID on the receiving user's phone may show the user's cell phone number.

In order to support phone calls made or received via the voice-controlled assistant 106, the assistant 106 may integrate with a cellular carrier 128. In an example implementation, the cellular carrier 128 includes functionality to simultaneously signal both the voice-controlled assistant 106 and the cell phone that there is an incoming call and enable the user to answer the call from either the voice-controlled assistant 106 or the cell phone.

For outbound calls, the cellular carrier 128 includes functionality to connect an outbound call from a voice-controlled assistant 106 to the dialed number. In an example implementation, the cellular carrier 128 includes the costs for the inbound or outbound call when billing for the user's cell phone. For example, monthly minutes and charges for the call would appear in a user's monthly cell phone bill.

Figure 3:
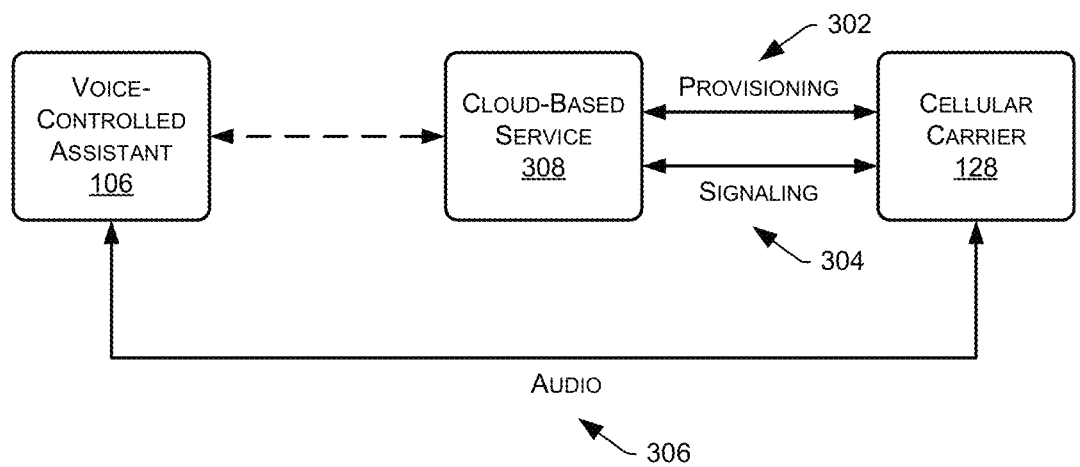
FIG. 3 shows a block diagram of selected interfaces between a voice-controlled assistant, a cloud based service, and a cellular carrier network.

FIG. 3 illustrates example integration points with a cellular carrier 128. Various integration points may exist between a voice-controlled assistant 106 and a cellular carrier 128. These may include, but are not limited to, a provisioning interface 302, a signaling interface 304, and an audio interface 306.

The provisioning interface 302 enables a user to associate the voice-controlled assistant 106 with a cell phone number so that the voice-controlled assistant 106 can ring when the user's cell phone rings. For example, as part of a setup process, the user submits his or her cell phone number to a cloud-based service 308, which may be implemented as part of remote computing resources 114. The cloud-based service 308 in turn submits the phone number to the cell carrier 128 via the provisioning interface 302. In an example implementation, the cellular carrier will attempt to confirm the request directly with the user via the user's cell phone. When the user confirms or denies the request, the cell carrier 128 sends a response back to the cloud-based service 308 via the provisioning interface 302. The provisioning interface 302 may be implemented as a REST (HTTP-based) API, which may be developed, managed, and maintained by the cellular carrier 128. Software residing in the cloud-based service 308 that communicates with the provisioning interface 302 may be implemented by an entity providing the cloud-based service 308.

The signaling interface 304 enables notification of an incoming call to be signaled through both the cell phone and the voice-controlled assistant 106. In an example implementation, when a user (who has also confirmed his provisioning request as described above) receives a phone call on his cell phone, the cellular carrier 128 will simultaneously signal the cell phone and the cloud-based service 308 via the signaling interface 304. When the cloud-based service 308 receives this signal via the signaling interface 304, the cloud-based service 308 will communicate directly with the specific voice-controlled assistant 106 corresponding to the user's cell phone number.

In an example implementation, the user's cell phone number may be associated with multiple voice-controlled assistants. In such a scenario, each of the voice-controlled assistants associated with the user's cell phone number may be notified of an incoming call. Alternatively, notification will be sent to the voice-controlled assistant associated with the cell phone that is nearest in proximity to the cell phone. If the user wants to answer via the voice-controlled assistant 106, the cloud-based service 308 will signal the cellular carrier 128 via the signaling interface 304 that the call should be routed to the voice-controlled assistant 106.

For outbound calls requested via the user's voice-controlled assistant 106, the same signaling interface 304 may be used to indicate from the cloud-based service 308 to the cell carrier 128 that the user wants to place an outbound call. When the dialed party answers the request, the cellular carrier 128 will signal to the cloud-based service 308 that the call has been answered. In an example implementation, the signaling interface 304 may also pass along information to the voice-controlled assistant 106 via the cloud-based service 308, indicating an IP address where the voice-controlled assistant 106 is to connect to the cell carrier 128 to enable the phone communication.

In an example implementation, the signaling interface 304 may be implemented using an open standards-based protocol, such as XMPP, to enable signaling between the cloud-based service 308 and the cellular carrier 128. The cellular carrier may be responsible for implementing software to enable the cellular carrier to communicate via this interface. Similarly, an entity associated with the cloud-based service 308 may be responsible for implementing software residing in the cloud-based service and/or the voice-controlled assistant that communicates with the signaling interface 304.

The audio interface 306 enables audio (e.g., a phone conversation) to be transmitted between the voice-controlled assistant 106 and the cellular carrier 128. In an example implementation, once an inbound or outbound call has been signaled and either the voice-controlled assistant answers (for inbound) or the dialed party answers (for outbound calls), the voice-controlled assistant 106 will directly connect to the IP address specified via the signaling interface 304 (as described above) and begin to stream audio. Through the audio interface 306, the actual audio 'conversation' between the voice-controlled assistant user and another party is transmitted.

Figure 4:
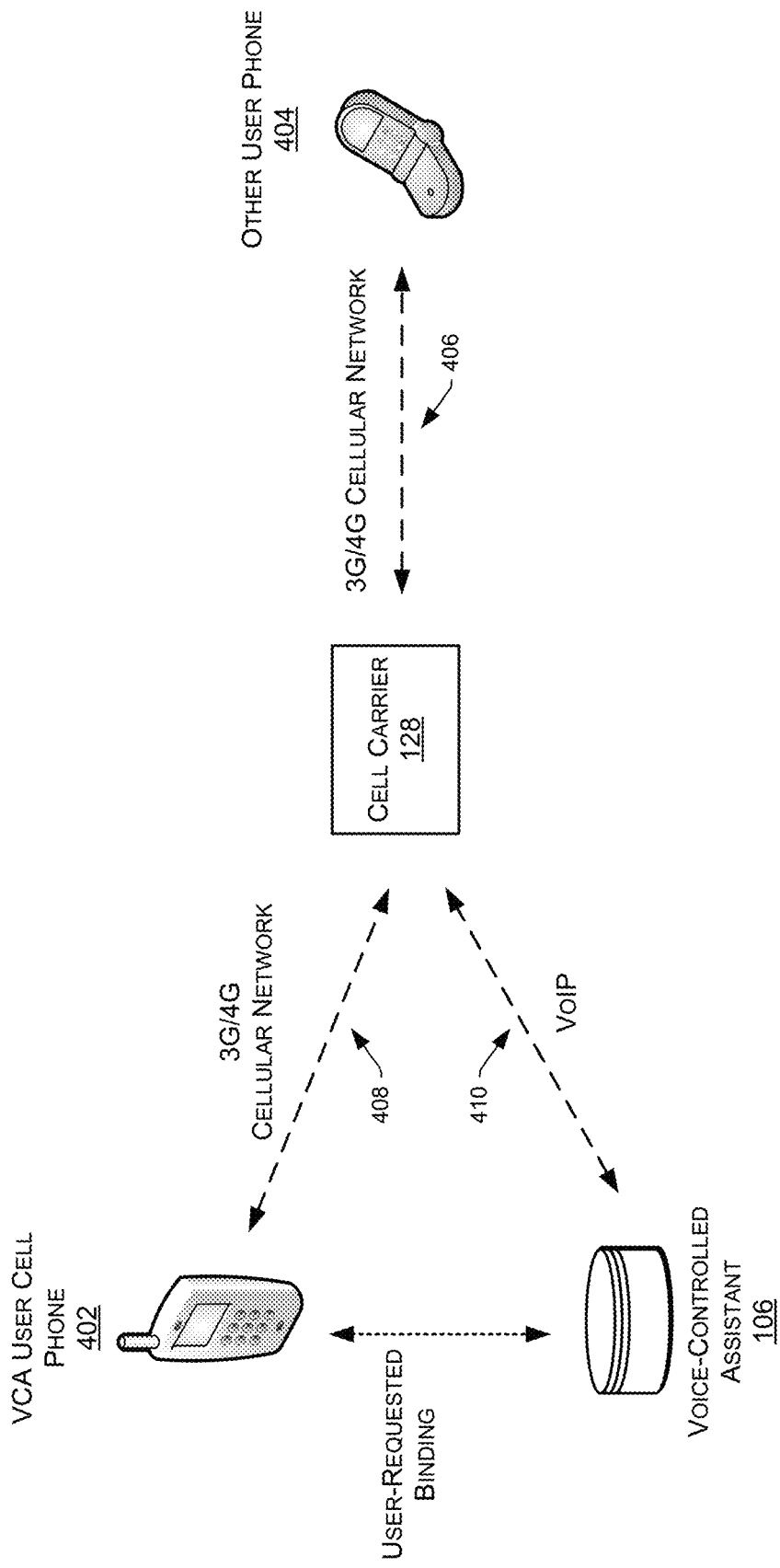
FIG. 4 shows a pictorial diagram of example communication paths between various devices and a cell carrier.

FIG. 4 illustrates example communication paths between various devices and the cell carrier 128. Devices associated with user 104 include the voice-controlled assistant 106 and the user cell phone 402. As illustrated and described below with reference to FIG. 6, the VCA 106 and the user's cell phone 402 may be bound through a provisioning process, which indicates to the cell carrier 128 that the two devices are both to be associated with the same cell phone number.

When a call is established between the user 104 and another user through the other user's phone 404, the cell carrier may manage the call over various communication paths. For example, the cell carrier 128 acts as a middle-man to manage the communication between the devices of the two users. Communication between the cell carrier 128 and the other user's phone 404 may be handled over any type of communication path, for example, a 3G or 4G cellular network 406. Alternatively, depending on the type of device used by the other user, other types of communication networks may be used.

Communication between the cell carrier 128 and the devices of user 104 may be carried over different communication paths depending on the device that is currently being used. For example, if the user 104 is using their cell phone 402, the communication may be handled over a 3G or 4G cellular network 408. If the user 104 is using their voice-controlled assistant 106 to participate in the telephone call, the communication may be handled over a voice-over-IP network path 410.

In an example implementation, the system may be configured to enable a single phone call to be handled simultaneously over both the cellular network 408 and the VoIP network 410. In this scenario, a first user 104 can participate in the call using the user's cell phone 402 while another user can participate in the same call using the voice-controlled assistant 106.

In an example implementation, the cell carrier further manages behavior of the user's devices during a call. For example, while a phone call is being conducted via the VCA, the user's cell phone to which the VCA is bound is configured to prevent the user from making an outbound call from the cell phone. In this way, a single phone number, which is associated with both the cell phone and VCA can only participate in a single phone call at any given time.

Similarly, while a phone call is being conducted via the VCA, if another incoming call directed to the same phone number is received, even though the cell phone is not actively participating in the call, the calling party will hear a busy signal and/or will be routed to voicemail.

FIGS. 5-15 show illustrative processes for managing phone calls in a system that includes a cell phone and at least one voice-controlled assistant. The processes described herein may be implemented by the architectures described herein, or by other architectures. These processes are illustrated as collections of blocks in logical flow graphs. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented with other architectures as well.

Figure 5:
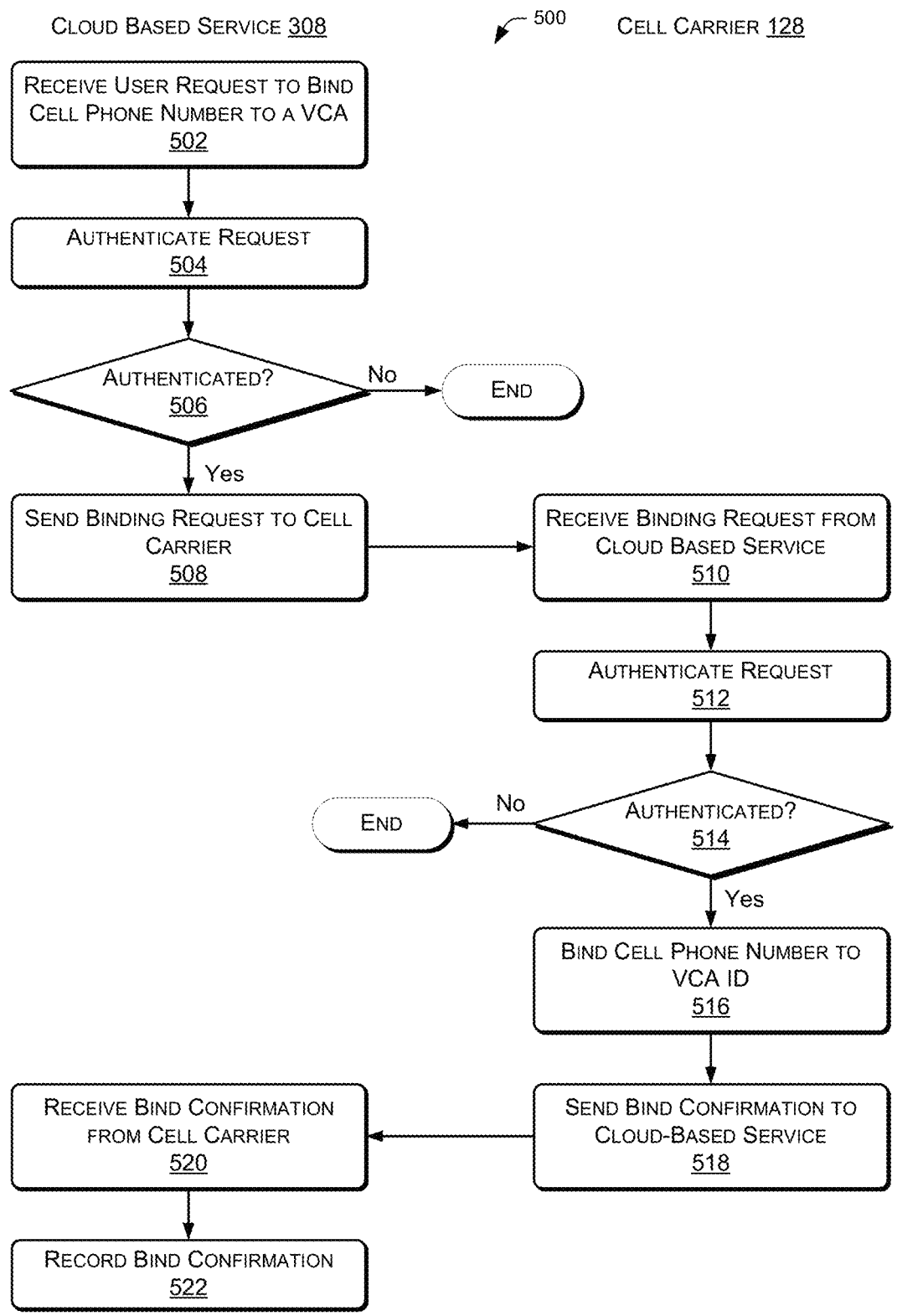
FIG. 5 shows an illustrative process of binding a particular cell phone number to a particular voice-controlled assistant.

FIG. 5 shows an illustrative process 500 of binding a particular cell phone number to a particular voice-controlled assistant.

At 502, a cloud-based service 308 receives a user request to bind a cell phone number to a voice-controlled assistant. For example, the user may complete and submit to the cloud-based service 308, a web-based form through which the cell phone number and an ID associated with the voice-controlled assistant are specified. Other techniques may also be used to request a binding, including, but not limited to, for example, the user submitting the request directly to the cellular carrier through a website, via a phone call, via a text message, or the like, or the user entering a voice command through the VCA, specifying a cell phone number to which the VCA is to be bound.

In an example implementation, the ID associated with the voice-controlled assistant may be a device ID specific to the particular VCA. Alternatively, the ID associated with the voice-controlled assistant may be an IP address or some other type of device-specific identifier.

At 504, the cloud-based service 308 authenticates the request. For example, the cloud-based service 308 may employ any of a number of techniques to confirm that the user entered the correct phone number. In one implementation, the cloud-based service 308 may send an SMS message to the phone number entered on the form and wait for a reply. The reply may be in any of a variety of forms, including, but not limited to, a reply SMS message or submission of another form with a code that was included in the SMS message from the cloud-based service. Alternatively, the cloud-based service may place a call to the specified phone number and request that the user enter a security code that is specifically associated with the user of the cell phone. This level of authentication may be used to confirm that the user is in possession of the phone associated with the submitted cell phone number.

At 506, a determination is made as to whether or not the authentication was successful. For example, if an accurate response to the authentication SMS message or call is received, then the authentication is deemed successful. On the other hand, if an inaccurate response is received or no response is received within a threshold time limit, then the authentication is deemed unsuccessful.

If the authentication at 506 is deemed unsuccessful, then the process terminates. If the authentication at 506 is deemed successful, then the process continues at 508.

At 508, the cloud-based service 308 sends the binding request, including the cell phone number and the VCA ID to the cell carrier 128. For example, the binding request may be sent over the network 116 from the remote computing resource 114 to the cell carrier 128.

At 510, the cell carrier 128 receives the binding request, for example, over the network 116.

At 512, the cell carrier 128 authenticates the request. For example, the cell carrier 128 may employ any of a number of techniques to confirm that the phone number specified in the request belongs to the user and is authorized to be bound to the particular VCA. In one implementation, the cell carrier 128 may access a data store that maintains associations between VCAs and cell phone numbers to confirm that the specified VCA and cell phone number are associated with one another.

At 514, a determination is made as to whether or not the authentication was successful.

If the authentication at 514 is deemed unsuccessful, then the process terminates. If the authentication at 514 is deemed successful, then the process continues at 516.

At 516, the cell carrier 128 binds the cell phone number to the VCA ID. For example, the cell carrier 128 may maintain a data store that identifies for each of any number of cell phone numbers, one or more VCAs to which the cell phone number is bound. In an example implementation, the VCA ID that was submitted in the binding request is used by the cell carrier to bind the VCA to the cell phone number. In an alternate implementation, the cell carrier may assign a different, carrier-specific device ID to the VCA for binding purposes.

In an example implementation, any number of cell phone numbers may be bound to a single VCA and similarly, any number of VCAs may be bound to a single cell phone.

At 518, the cell carrier 128 sends a bind confirmation to the cloud-based service 308. For example, the cell carrier 128 may send a message to the cloud-based service 308 indicating that the bind was successful and specifying the cell phone number, the VCA ID submitted in the bind request, and, if applicable, a carrier-specific ID assigned to the VCA for binding purposes.

At 520, the cloud-based service 308 receives the bind confirmation from the cell carrier 128.

At 522, the cloud-based service 308 records the bind confirmation. For example, the cloud-based service 308 may also maintain a data store that indicates which VCA devices are bound to which cell phone numbers. In addition, the data store maintained by the cloud-based service 308 may maintain a mapping between the VCA identifier included in the initial bind request and a cell carrier specific identifier associated with the VCA.

Figure 6:
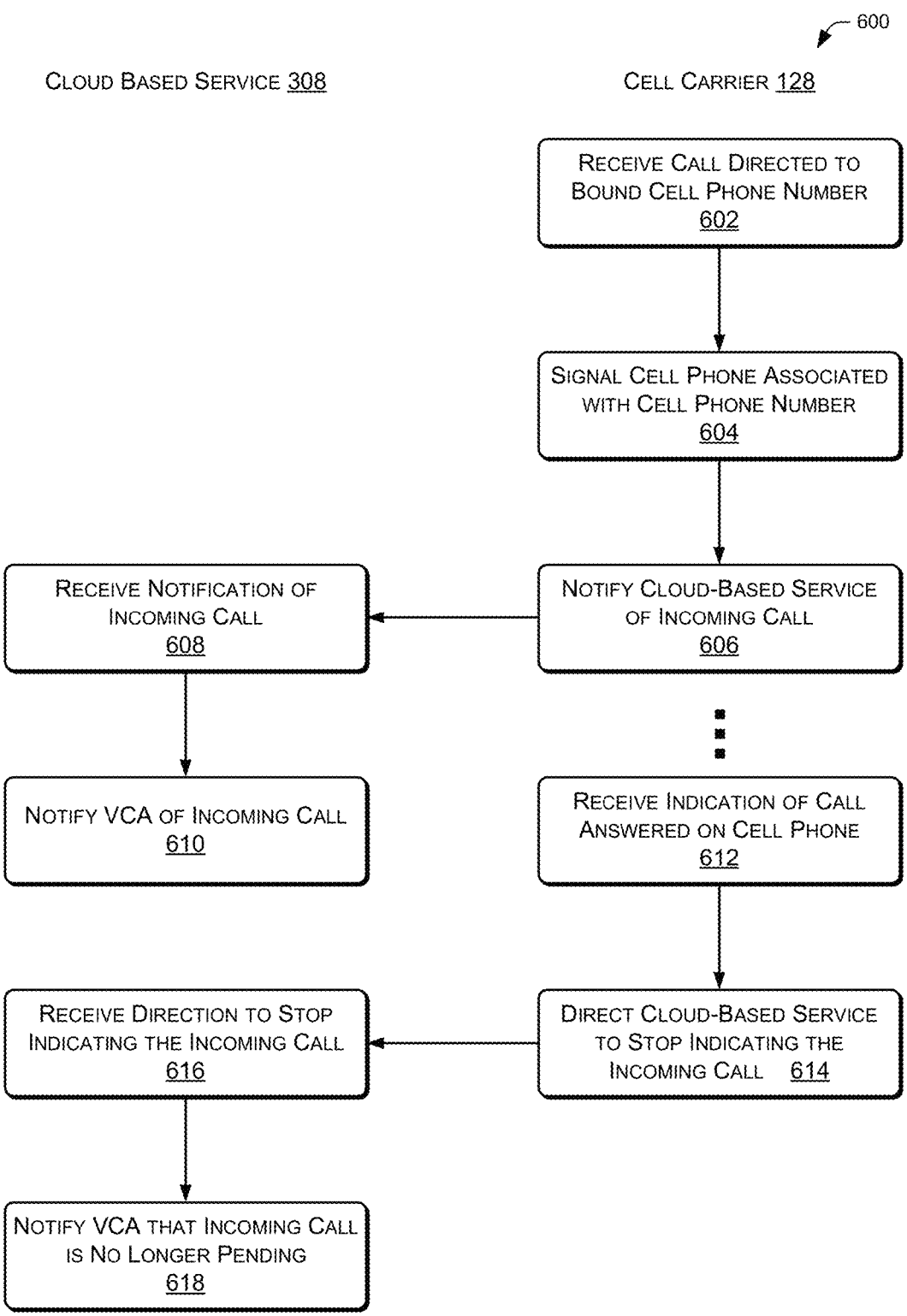
FIG. 6 shows an illustrative process of receiving an inbound call directed to a cell phone number that is bound to a voice-controlled assistant.

FIG. 6 shows an illustrative process 600 of receiving an inbound call directed to a cell phone number that is bound to a voice-controlled assistant.

At 602, a cell carrier 128 receives a call directed to a bound cell phone number. For example, when the cell carrier 128 receives an indication of an incoming call, the cell carrier 128 checks the binding data store and determines that the destination cell phone number is bound to at least one voice-controlled assistant.

At 604, the cell carrier 128 signals the cell phone associated with the destination cell phone number to indicate the incoming call. For example, the cell carrier 128 sends a signal over a cellular network to the destination cell phone number.

At 606, substantially simultaneous to 604, the cell carrier 128 notifies the cloud-based service 308 of the incoming call. For example, the cell carrier 128 may send a notification over the network 116 to the cloud-based service 308 of computing resources 114. The notification may include, for example, the calling phone number, the destination cell phone number, and an identifier associated with at least one VCA to which the destination cell phone number is bound.

At 608, the cloud-based service 308 receives the notification of the incoming call from the cell carrier 128. As described above, the identifier associated with the VCA at the cell carrier 128 may differ from an identifier of the VCA maintained by the cloud-based service 308. The cloud-based service 308 may cross-reference the VCA ID in a data store maintained by the cloud-based service to determine how to communicate with the VCA.

At 610, the cloud-based service 308 notifies the VCA of the incoming call. For example, the cloud-based service 308 may send a message to the VCA over the network 116. The message may include, for example, the calling phone number and the destination cell phone number.

At 612, after the VCA 106 and the cell phone to which the VCA is bound have been notified of the incoming call, cell carrier 128 may receive an indication that the call has been answered via the cell phone.

At 614, in response to receiving an indication that the call has been answered via the cell phone, the cell carrier 128 directs the cloud-based service 308 to stop indicating the incoming call.

At 616, the cloud-based service 308 receives the direction from the cell carrier 128.

At 618, the cloud-based service 306 notifies the VCA 106 that the incoming call is no longer pending.

Figure 7:
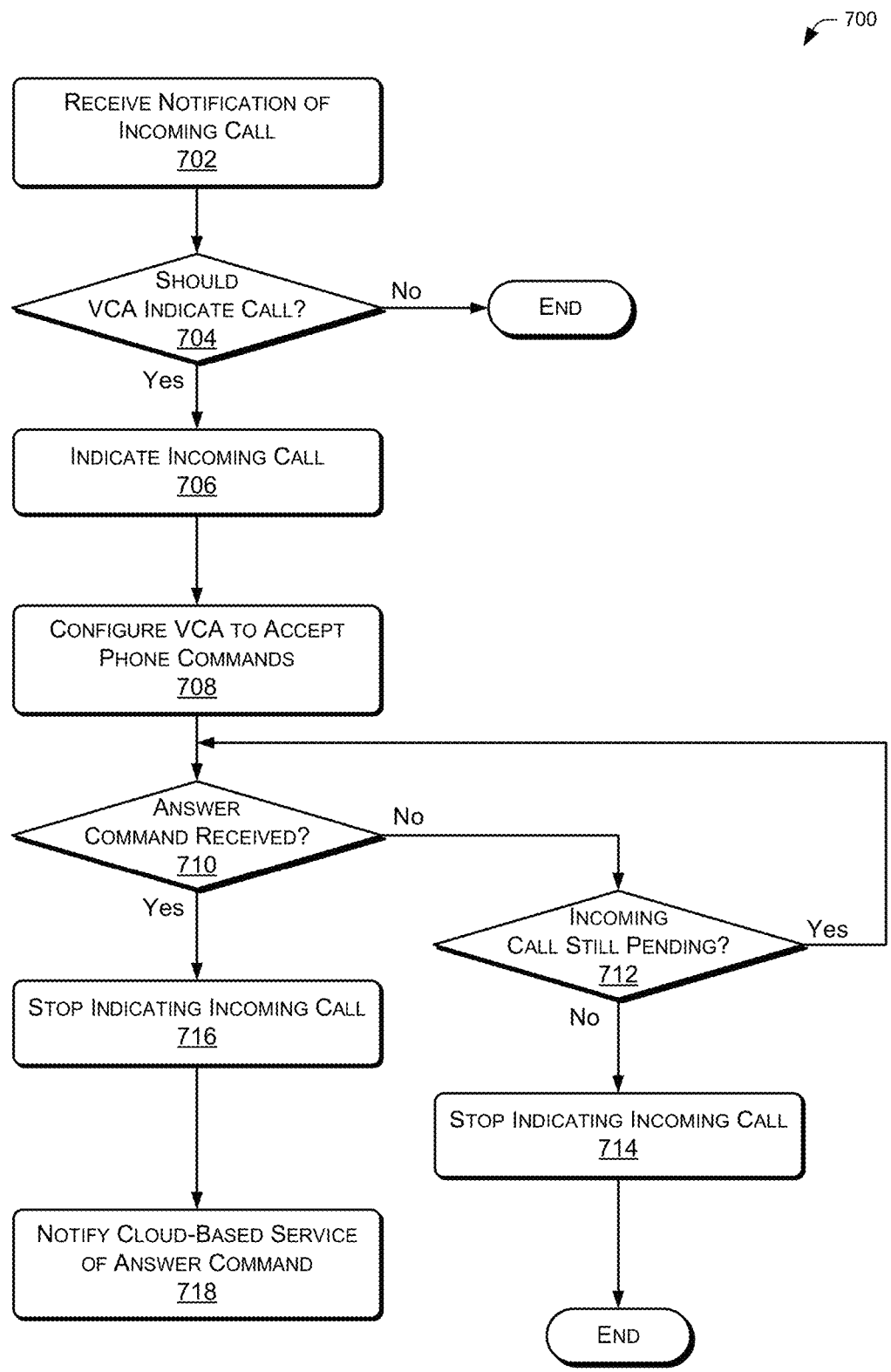
FIG. 7 shows an illustrative process of receiving notification of an inbound call at a voice-controlled assistant.

FIG. 7 shows an illustrative process 700 of receiving notification of an inbound call at a voice-controlled assistant.

At 702, a voice-controlled assistant 106 receives notification of an incoming call. For example, as described above with reference to 610 of FIG. 6, the cloud-based service 308 may send a notification of an incoming call to the VCA over the network 116.

At 704, a determination is made as to whether or not the VCA should indicate the incoming call. In an example implementation, the VCA may be configured to indicate the incoming call anytime a notice of an incoming call is received. However, there may be times when signaling an incoming call may not be desired.

For example, in an alternate implementation, the VCA may determine that it should indicate the incoming call only if the cell phone to which the incoming call is directed is in a threshold proximity to the VCA. Proximity of the destination cell phone may be determined in a variety of ways. As one example, proximity of a cell phone to the VCA may be based on geo-fencing. In this example, the carrier network may be aware of a physical address (e.g., street address) of the VCA, and may determine a current location of the cell phone using location based services such as cell tower triangulation or cell tower ID. GPS coordinates of the cell phone location and the physical address of the VCA are then compared, and the VCA is only notified of the incoming call if the cell phone is within a prescribed threshold distance from the VCA. Such proximity determination may also be used to determine whether or not outgoing calls can be initiated through the VCA.

In another example, the VCA is only allowed to signal the incoming call if the VCA and the cell phone are both connected to the same network, such as a local WIFI network. In an example implementation, the cell phone includes an application that can detect the presence of the VCA unit when the VCA is on the same network as the cell phone. Alternatively, the application may determine that the cell phone is connected to a network that the VCA is known to be associated with. After determining that the cell phone and VCA are on the same network, the application notifies the carrier network that the VCA is allowed to receive incoming calls (and/or to place outgoing calls).

In yet another example, the VCA and the cell phone may be paired using an active personal area network connection. In one instance, when the personal area network connection is determined, either the VCA or the cell phone may notify the carrier network to allow simultaneous signaling of inbound calls on both the cell phone and the VCA and/or to allow outbound calls to be placed from the VCA. In another instance, when the personal area network connection is determined, the VCA may automatically transition from an "off" state whereby no communication are permitted through the VCA to an "on" state whereby the VCA can accept incoming calls for cell phones with which it is paired or allow outbound calls using the cell phone's number. A personal area network may be established using any of various technologies including, but not limited to, infrared data association (IrDA), Bluetooth, wireless USB, Z-Wave, ZigBee, and so on.

In another alternate implementation, the VCA may determine that it should indicate the incoming call based on detected proximity or likely proximity of a user associated with the destination cell phone. For example, the cell phone may not be in proximity, but the user may be (e.g., the user may have left the phone in another location). Proximity of the user may be determined in a variety of ways, including but not limited to, any combination of: the VCA may examine heuristic data based on the time of day and a calendar or schedule associated with the user to determine a location at which the user is likely to be located, or the VCA may determine how recently the user interacted with the VCA to determine whether or not the user is likely proximate to the VCA at the current time.

The various techniques for determining proximity of the cell phone or the user to the VCA may be implemented in combination, with different techniques having different confidence levels. For example, triangulation data from the cell carrier may be given a relatively low confidence level while detection of the cell phone on a local wifi network may be given a relatively high confidence level. If proximity of a cell phone is detected through multiple techniques, the confidence levels of each of those techniques may be analyzed in combination to determine an overall confidence level for the detected cell phone proximity.

In yet another alternate implementation, the VCA may be configured by the user (e.g., via a command or a manual switch) to accept or not accept incoming phone calls.

If it is determined at 704 that the VCA should not indicate the incoming call (the "No" branch from block 704) (e.g., because the destination phone or the user is not in proximity or because a setting on the VCA indicates that the VCA should not indicate an incoming call), then processing terminates, and the incoming call is not indicated via the VCA.

On the other hand, if it is determined at 704 that the VCA should indicate the incoming call (the "Yes" branch from block 704), then at 706, the VCA indicates the incoming call. In an example implementation, the VCA may indicate the incoming call with any one or combination of a variety of audible or non-audible signals. For example, the VCA may make a sound similar to a telephone ringing. In another example the VCA may speak an audible notification, indicating the phone number or other identifier associated with the caller. Furthermore, if multiple cell phone numbers are bound to the same VCA, the incoming call indication may also indicate to which of the cell phones bound to the VCA the call is directed. In another example, the VCA may include lights that blink or otherwise indicate an incoming call.

While the VCA indicates the incoming call per 706, at 708, the VCA is configured to accept phone commands. For example, the VCA may be configured to recognize a set of voice commands. When an incoming call is indicated, the set of voice commands may be modified to include commands related to telephone communications. For example, the available command list may be modified to include commands such as "answer call", "hang up", and so on.

At 710, a determination is made as to whether or not an "answer" command has been received. For example, the VCA is configured to detect a command of "answer call" from a user while the VCA is indicating the incoming call. In an example implementation, a preliminary command (e.g., "wake") may be used to direct the VCA to listen for an answer command. This implementation may be useful to prevent the VCA from answering a call prematurely based on detected words in a conversation between two users in the room. For example, when the VCA begins indicating an incoming call, one user in the room may ask another "Are you going to answer that?" It would not be desirable for the VCA to answer the call based on detection of the word "answer" in that conversation.

If at 710 it is determined that an "answer" command has not yet been received (the "No" branch from block 710), then at 712 a determination is made as to whether or not the incoming call is still pending. For example, as described above with reference to blocks 612-618 of FIG. 6, the VCA may receive an indication that the incoming call is no longer pending if a user of the cell phone that is bound to the VCA answers the incoming call via the cell phone.

If at 712 it is determined that the incoming call is still pending (the "Yes" branch from block 712), then processing continues as described above with reference to 710.

On the other hand, if at 712 it is determined that the incoming call is no longer pending (the "No" branch from block 712), then at 714, the VCA stops indicating the incoming call. In an example implementation, when the incoming call indication is terminated, any configuration done to the VCA to accept phone commands is also reversed.

Referring back to block 710, if it is determined that an "answer" command has been received (the "Yes" branch from block 710), then at 716, the VCA stops indicating the incoming call.

At 718, the VCA notifies the cloud-based service of the received "answer" command. For example, the VCA 106 sends an indication of the "answer" command to the cloud-based service 308 over the network 116.

Additional functionality to establish the phone call after the "answer" command is received is described below with reference to FIG. 8.

Figure 8:
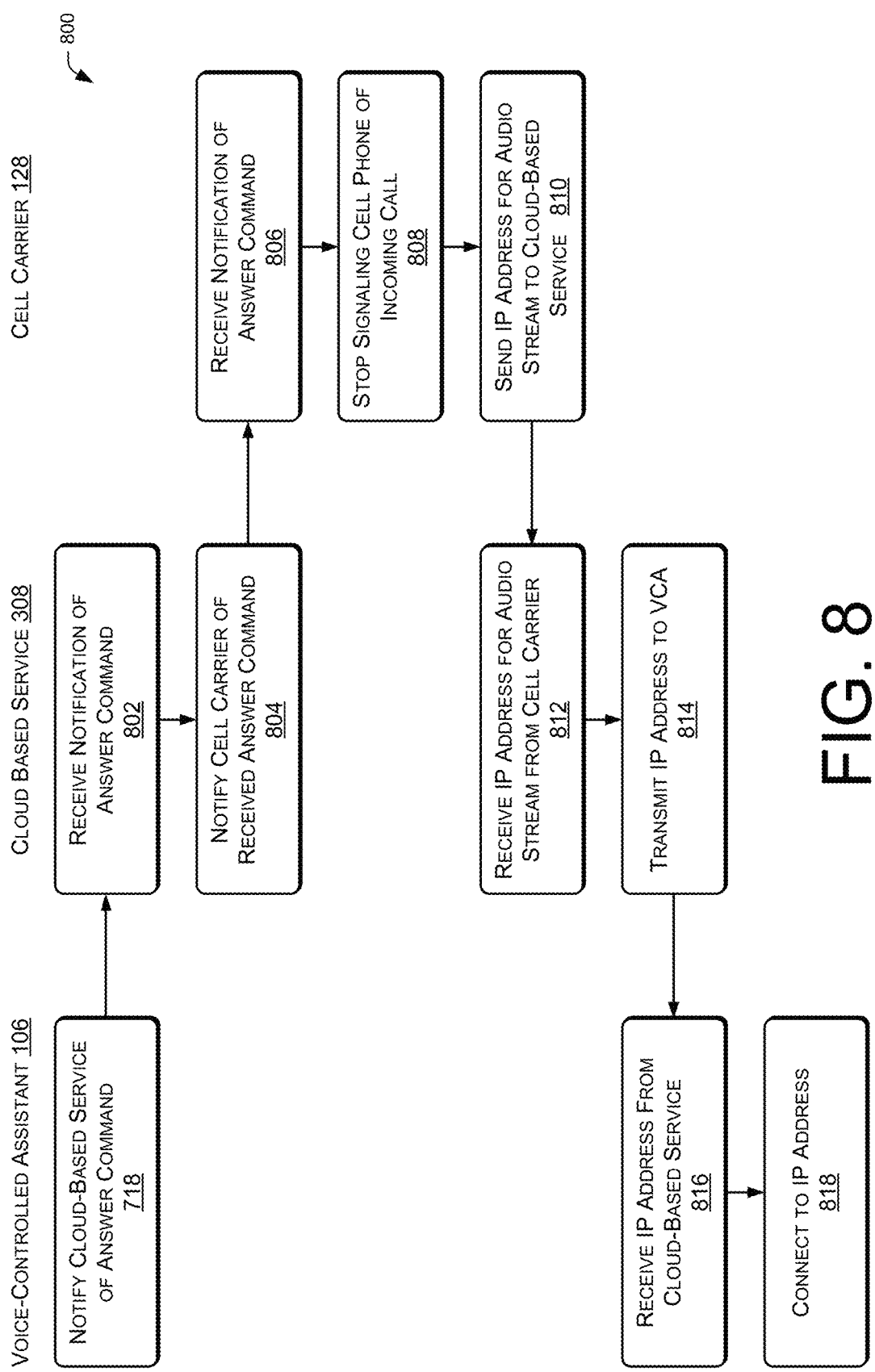
FIG. 8 shows an illustrative process of establishing a connection between an inbound call and a voice-controlled assistant.

FIG. 8 shows an illustrative process 800 of establishing a connection between an inbound call and a voice-controlled assistant.

As described above, at 718, the voice-controlled assistant 106 notifies the cloud-based service 308 of an "answer" command received from a user of the VCA.

At 802, the cloud-based service 308 receives notification of the "answer" command from the VCA 106. For example, the notification is received over the network 116.

At 804, the cloud-based service 308 notifies the cell carrier 128 of the received "answer" command. For example, the cloud-based service 308 sends a notification over the network 116.

At 806, the cell carrier 128 receives the notification of the "answer" command from the cloud-based service 308.

At 808, in response to receiving notification of the "answer" command received through the VCA bound to the destination cell phone number, the cell carrier stops signaling the incoming call to the cell phone associated with the destination cell phone number. That is, because the user has indicated a desire to answer the incoming call through the VCA, the cell phone that is associated with the destination cell phone number is directed to stop ringing.

At 810, also in response to receiving notification of the "answer" command received through the VCA, the cell carrier sends an IP address for an audio stream to the cloud-based service 308. The IP address is associated with an audio communication channel over which the incoming phone call will be transmitted between the VCA and the cell carrier. The cell carrier will use another communication channel (e.g., over a 3G or 4G cellular network) to communicate with the device (e.g., a phone) through which the call was initiated.

At 812, the cloud-based service 308 receives the IP address for the audio stream from the cell carrier 128. For example, the cloud-based service receives the IP address over the network 116.

At 814, the cloud-based service 308 transmits the IP address to the VCA 106 over, for example, the network 116.

At 816, the VCA 106 receives the IP address from the cloud-based service 308 via the network 116.

At 818, the VCA 106 connects to the IP address that is received from the cell carrier 128 via the cloud-based service 308. When the VCA connects to the IP address, a connection is thus established between the VCA and the cell carrier via a network (e.g., a VoIP network), and a connection is established between the cell carrier and the caller via another connection (e.g., over a cellular telephone network). The cell carrier 128 acts as a middle-man to facilitate the communication between the caller and the user of the VCA.

Figure 9:
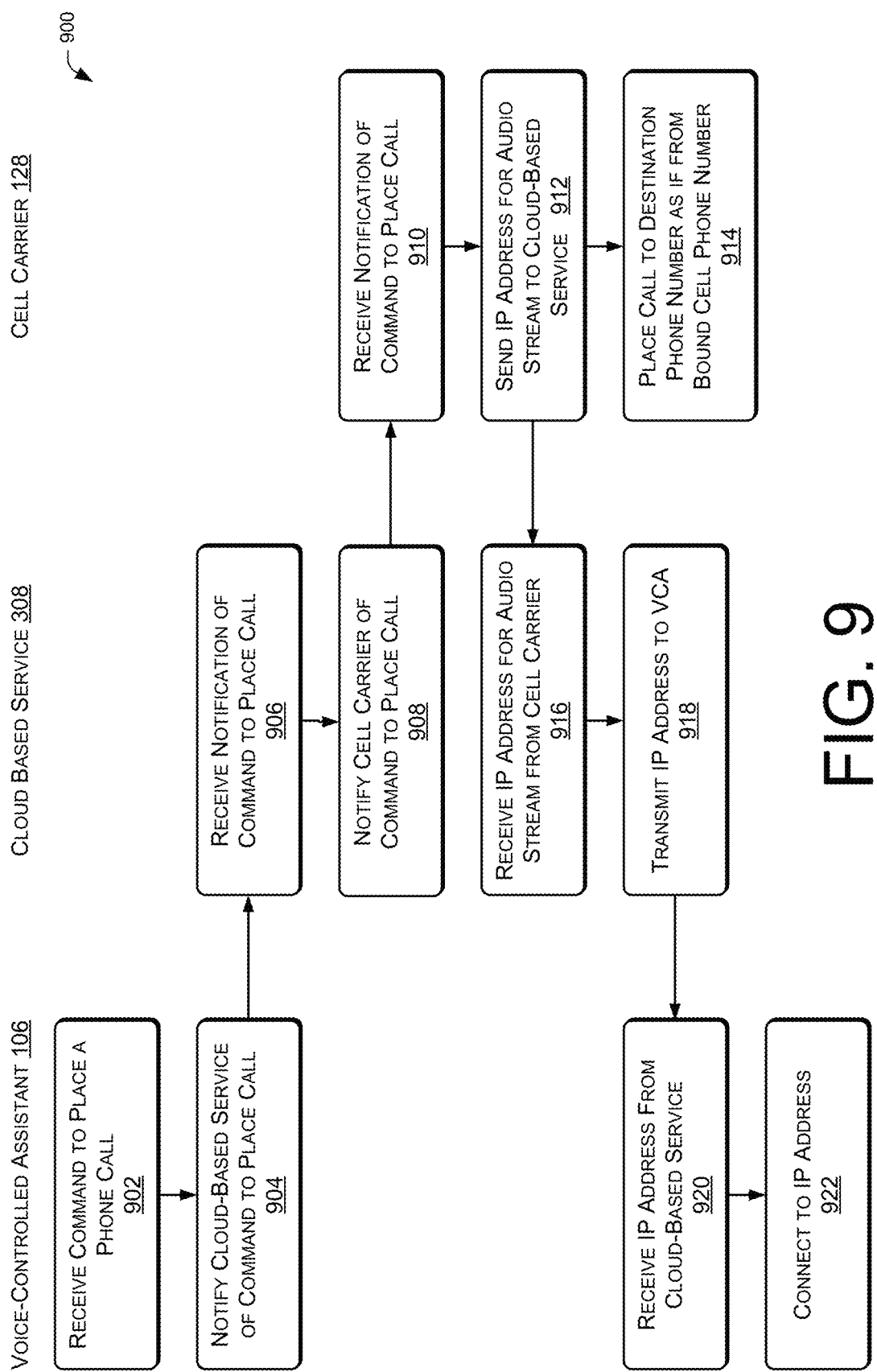
FIG. 9 shows an illustrative process of placing an outgoing phone call from a voice-controlled assistant.

FIG. 9 shows an illustrative process 900 of placing an outgoing phone call from a voice-controlled assistant.

At 902, the VCA 106 receives a command to place a phone call. In an example implementation, the command includes an indication of the destination phone number to be called. Alternatively, the command may include an identity of a user to call, and the VCA determines a phone number associated with the user to be called. In yet another example, the VCA may perform speech recognition on the received command to identify the user and, thereafter, may map this identification to the cell phone associated with the user.

At 904, the VCA 106 notifies the cloud-based service 308 of the command to place a call. For example, the VCA 106 sends a voice command received from a user to the cloud-based service 308 over the network 116.

At 906, the cloud-based service 308 receives notification of the command to place the call.

At 908, the cloud-based service 308 notifies the cell carrier 128 of the command to place the call.

At 910, the cell carrier 128 receives notification of the command to place the call.

At 912, in response to receiving notification of the "call" command received through the VCA, the cell carrier sends an IP address for an audio stream to the cloud-based service 308. The IP address is associated with an audio communication channel over which the requested outgoing phone call will be transmitted between the VCA and the cell carrier. The cell carrier will use another communication channel (e.g., over a 3G or 4G cellular network) to communicate with the device (e.g., a phone) to which the call will be placed.

At 914, also in response to receiving notification of the "call" command received through the VCA, the cell carrier places a call to the destination phone number specified in the "call" command as if the call originated from the cell phone number to which the VCA 106 is bound.

At 916, the cloud-based service 308 receives the IP address for the audio stream from the cell carrier 128. For example, the cloud-based service receives the IP address over the network 116.

At 918, the cloud-based service 308 transmits the IP address to the VCA 106 over, for example, the network 116.

At 920, the VCA 106 receives the IP address from the cloud-based service 308 via the network 116.

At 922, the VCA 106 connects to the IP address that is received from the cell carrier 128 via the cloud-based service 308. When the VCA connects to the IP address, a connection is thus established between the VCA and the cell carrier via a network (e.g., a VoIP network), and a connection is established between the cell carrier and the destination phone number via another connection (e.g., over a cellular telephone network). The cell carrier 128 acts as a middle-man to facilitate the communication between the user of the VCA and the user being called.

Figure 10:
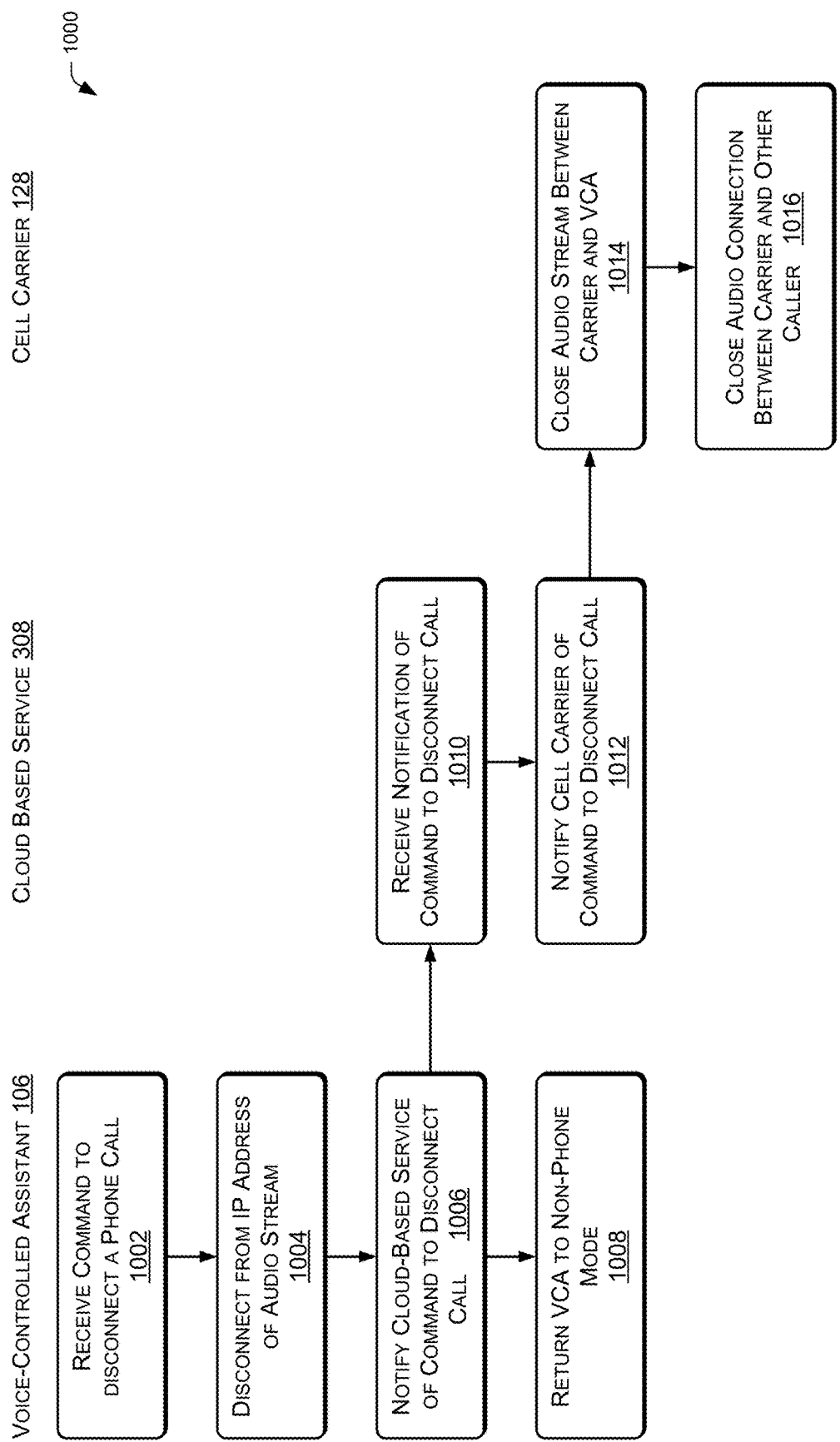
FIG. 10 shows an illustrative process of disconnecting a phone call based on a disconnect command received through a voice-controlled assistant.

FIG. 10 shows an illustrative process 1000 of disconnecting a phone call based on a disconnect command received through a voice-controlled assistant.

At 1002, the VCA 106 receives a command to disconnect a phone call. For example, the user may direct a voice command to the VCA indicating a desire to hang up the call.

At 1004, in response to the received command to disconnect the call, the VCA disconnects from the IP address of the audio stream associated with the call.

At 1006, the VCA 106 notifies the cloud-based service 308 of the command to disconnect the call.

At 1008, the VCA 106 returns to a non-phone mode. For example, as described above with reference to block 708 of FIG. 7, when a phone call is established through the VCA, the VCA may be configured to accept phone commands. This configuration may be thought of as putting the VCA in a "phone mode." When the call is disconnected, the configuration may be reversed, removing the VCA from "phone mode."

At 1010, the cloud-based service 308 receives the notification of the disconnect command.

At 1012, the cloud-based service 308 notifies the cell carrier 128 of the command to disconnect the call.

At 1014, in response to receiving the notification of the disconnect command, the cell carrier 128 closes the audio stream over which the VCA was receiving the phone call communications.

At 1016, the cell carrier 128 closes the audio connection between the cell carrier and the other caller. For example, referring to FIG. 4, the connection over the cellular network 406 is closed.

Figure 11:
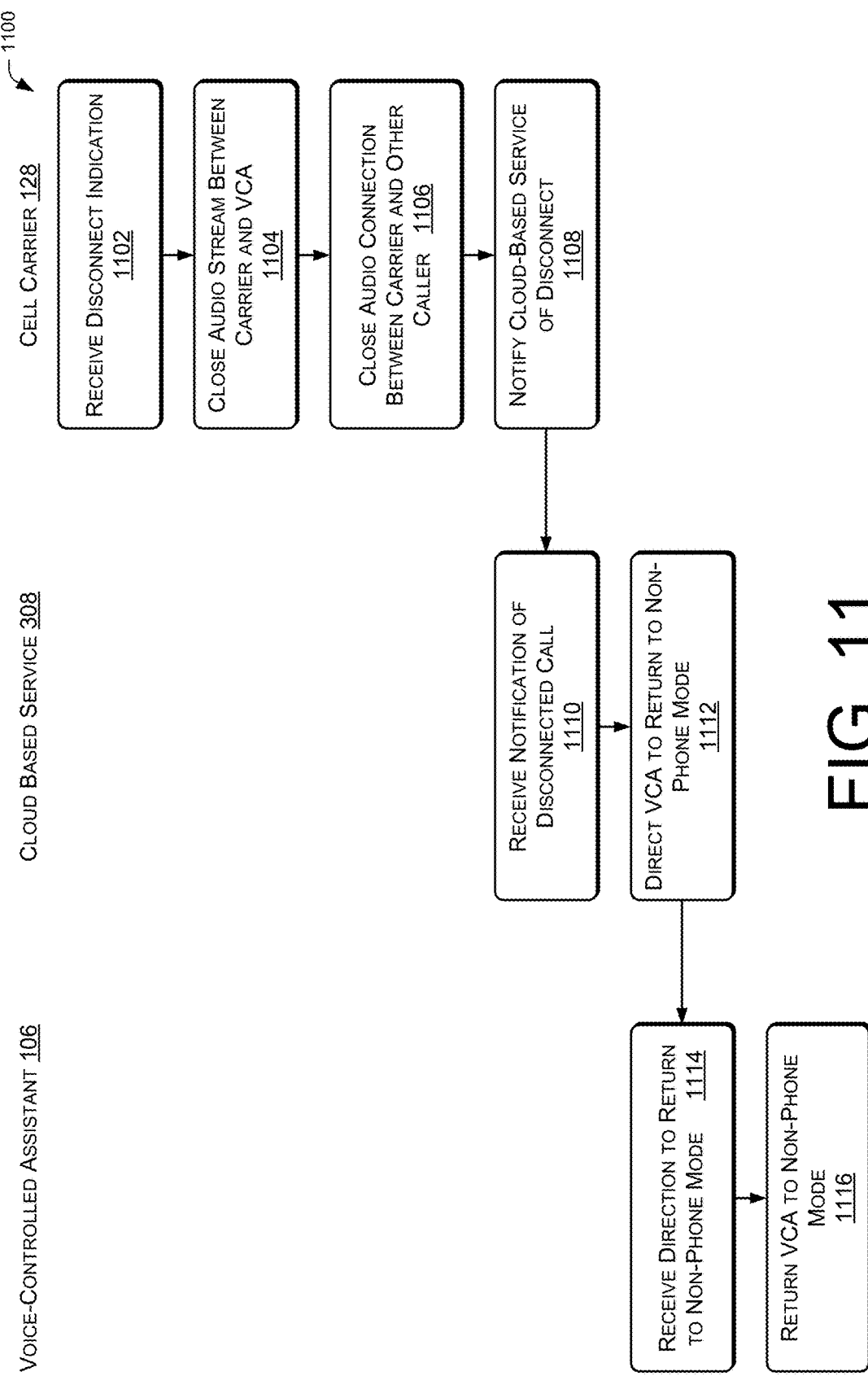
FIG. 11 shows an illustrative process of disconnecting a phone call being conducted through a voice-controlled assistant when the other caller disconnects from the call.

FIG. 11 shows an illustrative process 1100 of disconnecting a phone call being conducted through a voice-controlled assistant when the other caller disconnects from the call.

At 1102, the cell carrier 128 receives an indication of a disconnect. For example, referring to FIG. 4, the cell carrier 128 may detect that the connection over the cellular network 406 has been lost.

At 1104, in response to receiving the indication of the disconnect, the cell carrier 128 closes the audio stream over which the VCA was receiving the phone call communications. For example, referring to FIG. 4, the connection over the VoIP network 410 is closed.

At 1106, the cell carrier 128 closes the audio connection between the cell carrier and the other caller. For example, referring to FIG. 4, the connection over the cellular network 406 is closed.

At 1108, the cell carrier 128 notifies the cloud-based service 308 of the disconnect.

At 1110, the cloud-based service 308 receives notification of the disconnected call.

At 1112, the cloud-based service 308 directs the VCA 106 to return to a non-phone mode.

At 1114, the VCA 106 receives the direction to return to a non-phone mode.

At 1116, the VCA returns to a non-phone mode.

Figure 12:
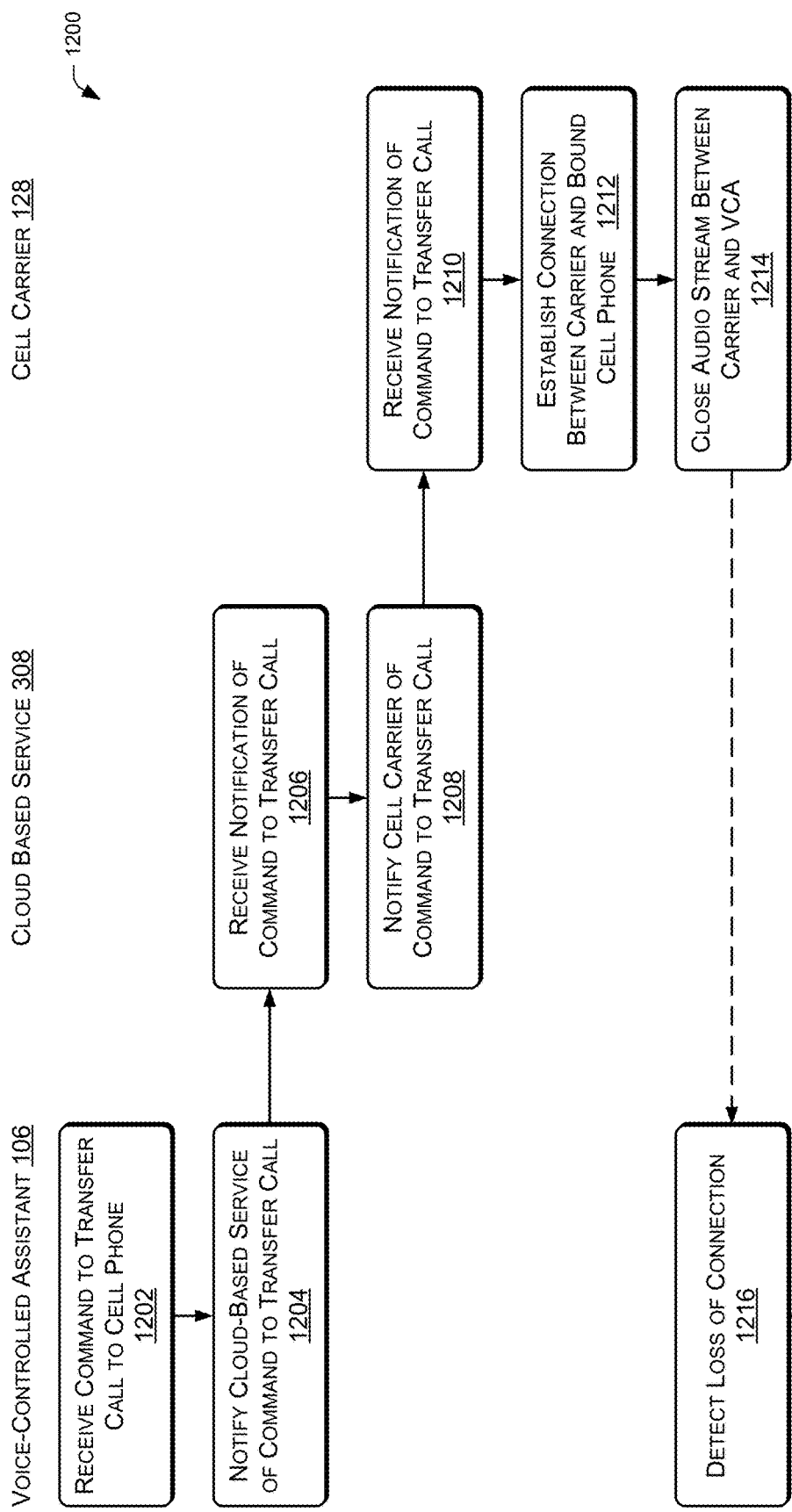
FIG. 12 shows an illustrative process of transferring a phone call from a voice-controlled assistant to a cell phone based on a command received through the voice-controlled assistant.

FIG. 12 shows an illustrative process 1200 of transferring a phone call from a voice-controlled assistant to a cell phone based on a command received through the voice-controlled assistant.

At 1202, the VCA 106 receives a command to transfer a phone call from the VCA to a cell phone. For example, the user may direct a voice command to the VCA indicating a desire to continue the call through the user's cell phone instead of through the VCA.

At 1204, the VCA 106 notifies the cloud-based service 308 of the command to transfer the call. The notification may include a variety of information including, for example, any combination of a user identifier, a cell phone identifier, a VCA identifier, and so on.

At 1206, the cloud-based service 308 receives the notification of the transfer command.

At 1208, the cloud-based service 308 notifies the cell carrier 128 of the command to transfer the call.

At 1210, the cell carrier 128 receives the notification of the transfer command.

At 1212, in response to receiving the notification of the transfer command, the cell carrier 128 establishes a connection between the cell carrier and the cell phone to which the VCA is bound. For example, referring to FIG. 4, the cell carrier establishes the cellular network connection 408 between the carrier and the user's cell phone 402.

At 1214, also in response to receiving the notification of the transfer command and after the connection between the cell carrier 128 and the cell phone is established, the cell carrier 128 closes the audio stream over which the VCA was receiving the phone call communications.

At 1216, the VCA detects the loss of the VoIP communication connection. Although not illustrated in FIG. 12, in an example implementation, the cell carrier may notify the cloud-based service 308 of the closed audio stream between the cell carrier and the VCA. The cloud-based service 308 may then direct the VCA to return to a non-phone mode.

At 1218, the VCA 106 returns to a non-phone mode. For example, as described above with reference to block 708 of FIG. 7, when a phone call is established through the VCA, the VCA may be configured to accept phone commands. This configuration may be thought of as putting the VCA in a "phone mode." When the call is disconnected, the configuration may be reversed, removing the VCA from "phone mode."

Figure 13:
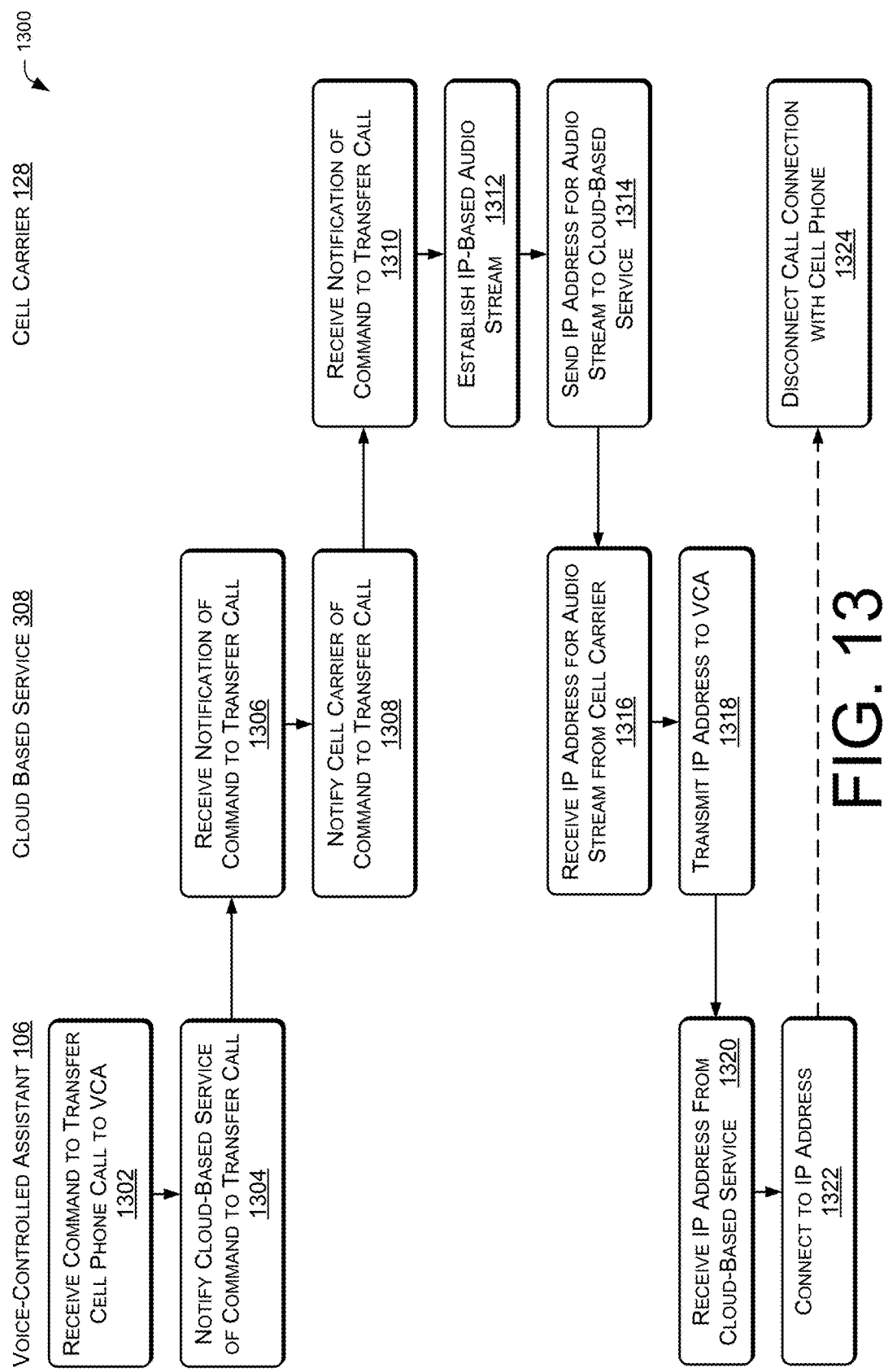
FIG. 13 shows an illustrative process of transferring a phone call from a cell phone to a voice-controlled assistant based on a command received through the voice-controlled assistant.

FIG. 13 shows an illustrative process 1300 of transferring a phone call from a cell phone to a voice-controlled assistant based on a command received through the voice-controlled assistant.

At 1302, the VCA 106 receives a command to transfer a phone call from a cell phone to the VCA. For example, the user may direct a voice command to the VCA indicating a desire to move the call that is currently occurring through the user's cell phone to continue the call through the VCA. Although not illustrated in FIG. 13, any number of techniques may be used to verify that the user requesting to transfer the call is authorized to do so. Furthermore, in example implementations, a command to transfer a call from the cell phone to the VCA may only be allowed if the cell phone is in proximity to the VCA.

At 1304, the VCA 106 notifies the cloud-based service 308 of the command to transfer the call. The notification may include a variety of information including, for example, any combination of a user identifier, a cell phone identifier, a VCA identifier, and so on.

At 1306, the cloud-based service 308 receives the notification of the transfer command.

At 1308, the cloud-based service 308 notifies the cell carrier 128 of the command to transfer the call.

At 1310, the cell carrier 128 receives the notification of the transfer command.

At 1312, in response to receiving the notification of the transfer command, the cell carrier 128 establishes an IP-based audio stream for communicating the phone call with the VCA.

At 1314, the cell carrier 128 sends an IP address associated with the IP-based audio stream to the cloud-based service 308.

At 1316, the cloud-based service 308 receives the IP address for the audio stream from the cell carrier.

At 1318, the cloud-based service 308 sends the IP address to the VCA, directing the VCA to connect to the IP address.

At 1320, the VCA receives the IP address from the cloud-based service 308.

At 1320, the VCA connects to the specified IP address, thereby becoming a device to which the phone call communications are now being sent.

At 1324, upon detecting that the connection between the cell carrier and the VCA has been established, the cell carrier disconnects the communication path between the cell carrier and the cell phone.

In an alternate implementation, rather than a command to transfer the call, the command may be a command to join the VCA to the call. In this scenario, the processing may be the same as that illustrated in FIG. 13, except that the call connection with the cell phone would not be disconnected at 1324.

Figure 14:
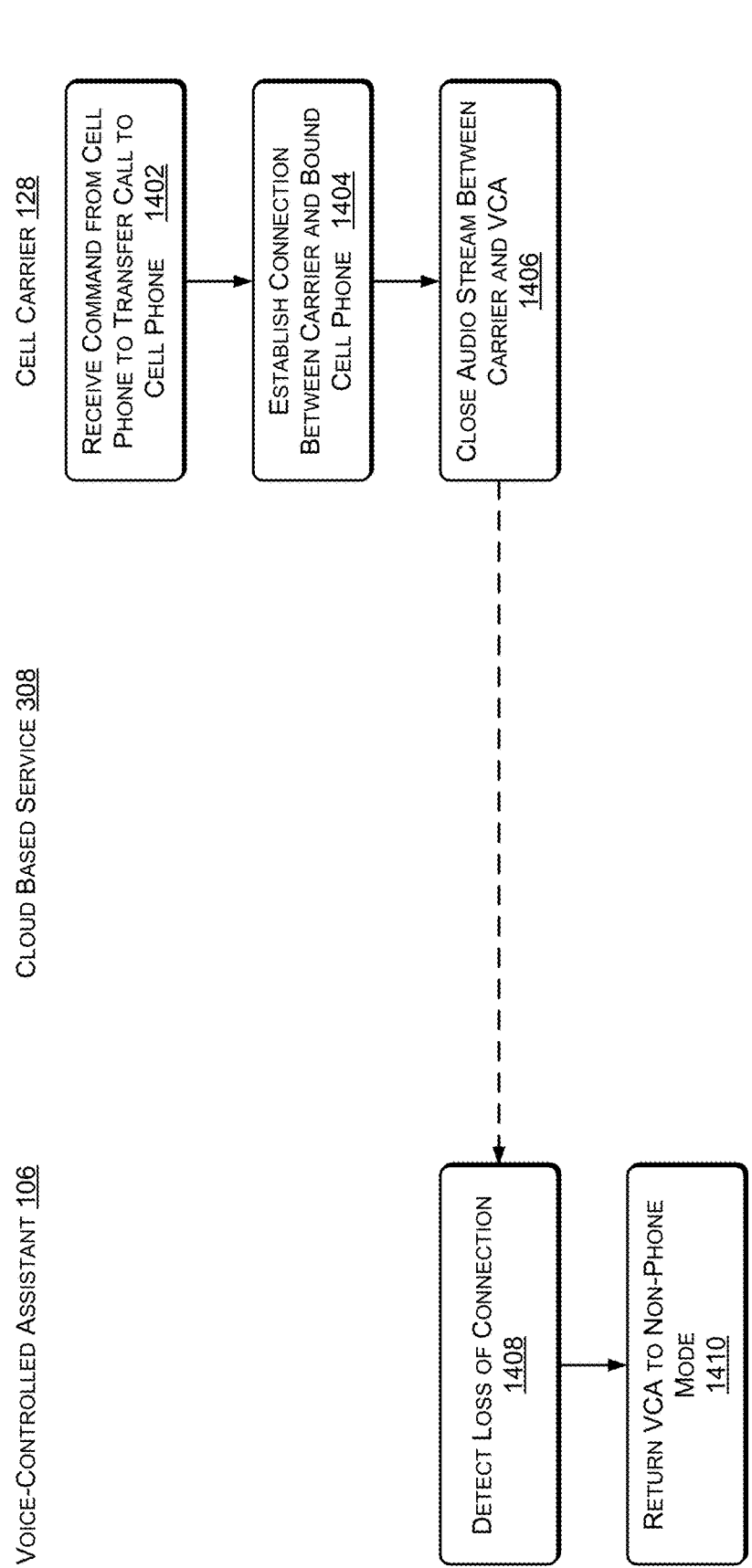
FIG. 14 shows an illustrative process of transferring a phone call from a voice-controlled assistant to a cell phone based on a command received through the cell phone.

FIG. 14 shows an illustrative process 1400 of transferring a phone call from a voice-controlled assistant to a cell phone based on a command received through the cell phone.

At 1402, the cell carrier 128 receives a command from a cell phone to transfer a phone call from the VCA to a cell phone. For example, the user may enter a menu command through the cell phone requesting the call transfer.

At 1404, in response to receiving the transfer command, the cell carrier 128 establishes a connection between the cell carrier and the cell phone to which the VCA currently responsible for the call is bound. For example, referring to FIG. 4, the cell carrier establishes the cellular network connection 408 between the carrier and the user's cell phone 402.

At 1406, also in response to receiving the transfer command and after the connection between the cell carrier 128 and the cell phone is established, the cell carrier 128 closes the audio stream over which the VCA was receiving the phone call communications.

At 1408, the VCA detects the loss of the VoIP communication connection. Although not illustrated in FIG. 14, in an example implementation, the cell carrier may notify the cloud-based service 308 of the closed audio stream between the cell carrier and the VCA. The cloud-based service 308 may then direct the VCA to return to a non-phone mode.

At 1410, the VCA 106 returns to a non-phone mode. For example, as described above with reference to block 708 of FIG. 7, when a phone call is established through the VCA, the VCA may be configured to accept phone commands. This configuration may be thought of as putting the VCA in a "phone mode." When the call is disconnected, the configuration may be reversed, removing the VCA from "phone mode."

Figure 15:
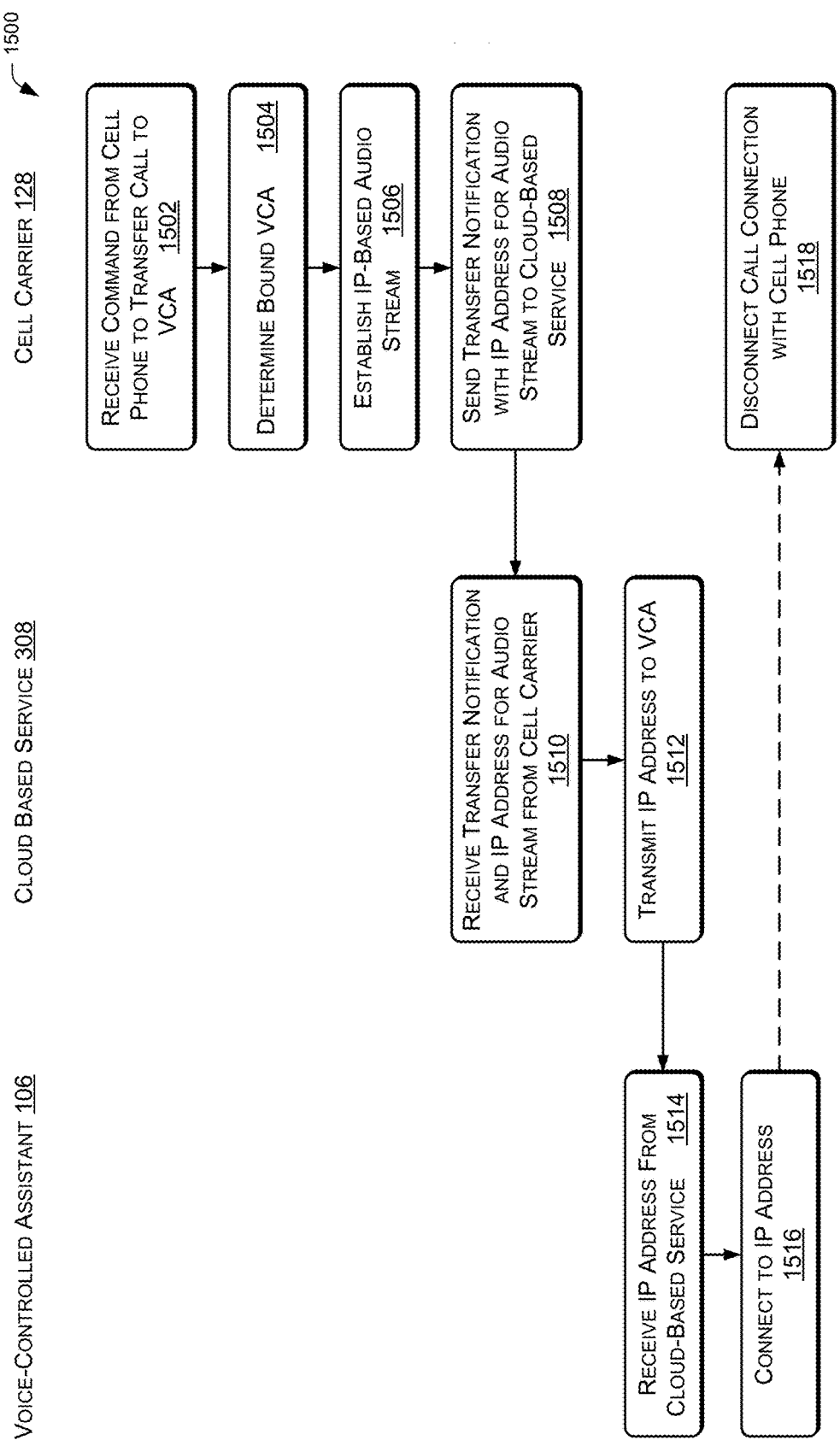
FIG. 15 shows an illustrative process of transferring a phone call from a cell phone to a voice-controlled assistant based on a command received through the cell phone.

FIG. 15 shows an illustrative process 1500 of transferring a phone call from a cell phone to a voice-controlled assistant based on a command received through the cell phone.

At 1502, the cell carrier 128 receives a command from a cell phone to transfer a phone call from the cell phone to a VCA. For example, the user may enter a menu or voice command through the cell phone requesting the call transfer.

At 1504, the cell carrier 128 determines a VCA to which the cell phone is bound.

At 1506, in response to receiving the transfer command, the cell carrier 128 establishes an IP-based audio stream for communicating the phone call with the VCA.

At 1508, the cell carrier 128 sends a notification of the transfer command and an IP address associated with the IP-based audio stream to the cloud-based service 308.

At 1510, the cloud-based service 308 receives the transfer notification and the IP address for the audio stream from the cell carrier.

At 1512, the cloud-based service 308 sends the IP address to the VCA, directing the VCA to connect to the IP address.

At 1514, the VCA receives the IP address from the cloud-based service 308.

At 1516, the VCA connects to the specified IP address, thereby becoming a device to which the phone call communications are now being sent.

At 1518, upon detecting that the connection between the cell carrier and the VCA has been established, the cell carrier disconnects the communication path between the cell carrier and the cell phone.

In an alternate implementation, rather than a command to transfer the call, the command may be a command to join the VCA to the call. In this scenario, the processing may be the same as that illustrated in FIG. 13, except that the call connection with the cell phone would not be disconnected at 1518.

FIGS. 6-15 illustrate methods for specific call functionality. The illustrated methods are examples, and the VCA described herein may be implemented to also support any number of other types of call functionality. For example, similar methods may be implemented enable the VCA to support answering a call via call waiting, setting up conference calls, declining a call, routing an incoming call to voicemail, checking voicemail, and any number of other similar call functionality.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A method comprising:

determining that a physical proximity of a mobile cellular phone and a voice-controlled device configured to detect audio from a physical environment are within a physical threshold proximity of each other in the physical environment, wherein the threshold physical proximity is determined based at least in part on a combination of at least two of a confidence level associated with triangulation data related to the phone, a confidence level associated with detection of the phone on a network associated with the voice-controlled device, or a confidence level associated with heuristic data associated with a user of the phone;

associating a phone number of the mobile cellular phone with the voice-controlled device based at least in part on the combination of confidence levels;

receiving at the voice-controlled device, a notification from a network-accessible service of an incoming phone call directed to the phone number;

providing, at the voice-controlled device, an indication of the incoming call;

determining, from an audio signal generated from audio from the environment, that the voice-controlled device has received an answer command; and at least partly in response to determining that the voice-controlled device has received the answer command:
  ceasing to indicate the incoming call;
  transmitting, to the network-accessible service, a notification of the received answer command;
  receiving an Internet protocol (IP) address from a cell carrier via the network-accessible service; and
  attempting to connect to a device associated with the IP address to establish a phone call connection within the environment between the voice-controlled device and another device via the cell carrier.

2. A method as recited in claim 1, wherein the phone number is indirectly associated with the voice-controlled device such that the voice-controlled device is associated with a user account and the phone number is associated with the user account.

3. A method implemented at least in part by a voice-controlled device, the method comprising:
   determining a mobile cellular phone of a user is within a threshold physical proximity of the voice-controlled device within a physical environment, wherein the threshold physical proximity is determined based at least in part on a combination of at least two of a confidence level associated with triangulation data related to the phone, a confidence level associated with detection of the phone on a network associated with the voice-controlled device, or a confidence level associated with heuristic data associated with a user of the phone;
   associating the voice-controlled device with a cell carrier associated with the mobile cellular phone based on determining that the mobile cellular phone of the user is within the threshold physical proximity of the voice-controlled device within the physical environment;
   receiving, within the environment in which the voice-controlled device resides, a command to place a phone call to a destination telephone number;
   notifying a network-accessible service of the command to place the phone call;
   receiving an Internet protocol (IP) address; and
   connecting to a device associated with the IP address to establish, via the cell carrier, a connection between the voice-controlled device and a device associated with the destination telephone number.

4. A method as recited in claim 3, wherein the voice-controlled device is indirectly associated with the mobile cellular phone based on a phone number of the mobile cellular phone being associated with a user account and the voice-controlled device being associated with the user account.

5. A method implemented at least in part by a network-accessible service, the method comprising:
   receiving a request to establish a phone call connection from a voice-controlled device positioned within a threshold physical proximity of a mobile cellular phone within a physical environment, wherein the threshold physical proximity is determined based at least in part on a combination of at least two of a confidence level associated with triangulation data related to the phone, a confidence level associated with detection of the phone on a network associated with the voice-controlled device, or a confidence level associated with heuristic data associated with a user of the phone, the voice-controlled device configured to at least detect vocal input within the physical environment;
   sending the request to a cell carrier associated with the mobile cellular phone;
   receiving an Internet protocol (IP) address to use for establishing an audio stream for the phone call; and
   sending an indication of the IP address to the voice-controlled device to enable the voice-controlled device to establish the phone call connection.

6. A method as recited in claim 5, wherein the request to establish a phone call connection comprises:
   a request to use the voice-controlled device to answer an incoming phone call; or
   a request to use the voice-controlled device to place an outgoing call.

7. A method implemented at least in part by a cell carrier, the method comprising:
   receiving a request to place a call to a destination phone number from a voice-controlled device within a threshold physical proximity of a mobile cellular phone and configured to at least detect audio within an environment, wherein the threshold physical proximity is determined based at least in part on a combination of at least two of a confidence level associated with triangulation data related to the phone, a confidence level associated with detection of the phone on a network associated with the voice-controlled device, or a confidence level associated with heuristic data associated with a user of the phone, the voice-controlled device associated with a phone number of the mobile cellular phone based at least in part on the voice-controlled device being within the threshold physical proximity of the mobile cellular phone;
   determining an Internet protocol (IP) address to use for establishing an audio stream between the voice-controlled device and the cell carrier;
   sending an indication of the IP address to the voice-controlled device to enable the voice-controlled device to establish the audio stream; and
   notifying a device associated with the destination phone number of the call.

8. A method as recited in claim 7, wherein the cell carrier sends the IP address to the voice-controlled device via a network-accessible service.

9. A method as recited in claim 7, wherein the notifying the device associated with the destination phone number of the call comprises providing an identification of the cell phone number associated with the voice-controlled device.

10. A method as recited in claim 7, further comprising:
    establishing a cellular network connection between the cell carrier and the device associated with the destination phone number of the call; and
    establishing a voice-over-IP network connection between the cell carrier and the voice-controlled device, such that the cellular network connection together with the voice-over-IP network connection results in a communication pathway between the voice-controlled device and the device associated with the destination phone number of the call.

11. A method comprising:
    receiving a request from a calling device to place a call to a destination phone number;
    receiving an indication that a mobile cellular phone associated with a cell carrier and a voice-controlled device are within a threshold physical proximity within a physical environment, wherein the threshold physical proximity is determined based at least in part on a combination of at least two of a confidence level associated with triangulation data related to the phone, a confidence level associated with detection of the phone on a network associated with the voice-controlled device, or a confidence level associated with heuristic data associated with a user of the phone, the voice-controlled device configured to at least receive voice input within the environment;
    sending a signal indicating the call to both the phone and the voice-controlled device based at least in part on the indication that the phone and the voice-controlled device are within the threshold proximity within the physical environment;

determining an IP address of an audio stream over which data associated with the phone call will be transmitted between the cell carrier and the voice-controlled device; and
sending an indication of the IP address to the voice-controlled device to enable the voice-controlled device to connect to the phone call.

12. A method as recited in claim 11, wherein the signal indicating the call is sent to the voice-controlled device via a network-accessible service.

13. A method as recited in claim 11, wherein:
the signal indicating the call is sent to the phone via a cellular telephone network; and
the signal indicating the call is sent to the voice-controlled device via an IP-based network.

14. A method as recited in claim 11, further comprising:
receiving an indication that the call has been answered via the phone; and
sending a notification to the voice-controlled device to cease indicating an incoming phone call.

15. A method as recited in claim 14, wherein the notification to cease indicating the incoming phone call is sent via a network-accessible service.

16. A method as recited in claim 11, further comprising:
receiving an indication that the call has been answered via the voice-controlled device;
sending a signal to the phone directing the phone to cease signaling an incoming phone call.

17. A method as recited in claim 11, wherein the indication of the IP address is sent to the voice-controlled device via a network-accessible service.

18. A method comprising:
receiving a request to associate a cell phone number of a mobile cellular phone with a voice-controlled device positioned within a physical environment, the voice-controlled device configured to at least receive voice input from a user within the physical environment;
determining whether the mobile cellular phone is within a threshold physical proximity of the voice-controlled device positioned within the physical environment, wherein the threshold physical proximity is determined based at least in part on a combination of at least two of a confidence level associated with triangulation data related to the phone, a confidence level associated with detection of the phone on a network associated with the voice-controlled device, or a confidence level associated with heuristic data associated with a user of the phone; and
associating the cell phone number with the voice-controlled device based at least in part on determining that the mobile cellular phone is within the threshold physical proximity of the voice-controlled device positioned within the physical environment such that phone calls directed to the cell phone number may be routed over a cellular network to the mobile cellular phone and over an Internet protocol (IP) network to the voice-controlled device positioned within the physical environment.

19. A method as recited in claim 18, wherein associating the cell phone number with the voice-controlled device comprises associating the cell phone number with a user account, wherein the user account is associated with the voice-controlled device.

20. A method as recited in claim 18, further comprising:
performing the associating based at least in part on determining that the mobile cellular phone is within the threshold physical proximity of the physical environment of the voice-controlled; and
preventing the associating from occurring based at least in part on determining that the mobile cellular phone is within the threshold physical proximity of the physical environment of the voice-controlled device.

21. A method as recited in claim 18, further comprising:
receiving an indication that a phone call is being placed to the cell phone number; and
providing an indication of the phone to both the mobile cellular phone and the voice-controlled device.

22. A method comprising:
establishing a phone call connection between a first user device associated with a first phone number and a second user device associated with a second phone number, wherein the second user device is a mobile cellular telephone and the third user device is a voice-controlled device, wherein the phone call connection includes:
a first network connection between a cell carrier and the first user device; and
a second network connection between the cell carrier and the second user device, wherein the second network connection comprises a cellular network connection;
receiving a request to transfer the phone call from the second user device to a third user device positioned within a physical environment, the third user device configured to at least receive audio within the physical environment and also associated with the second phone number based at least in part on a determination that the second user device and the third user device are within a threshold physical proximity to each other in the physical environment, wherein the threshold physical proximity is determined based at least in part on a combination of at least two of a confidence level associated with triangulation data related to the first user device, a confidence level associated with detection of the first user device on a network associated with the voice-controlled device, or a confidence level associated with heuristic data associated with a user of the first user device;
at least partly in response to receiving the request and while maintaining the first network connection between the cell carrier and the first user device:
establishing a third network connection between the cell carrier and the third user device to establish a phone call connection between the first user device and the third user device, wherein the third network connection is an IP-based network connection; and
closing the second network connection between the cell carrier and the second user device.

23. A method as recited in claim 22, wherein the request to transfer the phone call from the second user device to the third user device is received via the second user device.

24. A method as recited in claim 22, wherein the request to transfer the phone call from the second user device to the third user device is received via the third user device.

* * * * *